United States Patent
Roberts et al.

(10) Patent No.: US 10,739,100 B2
(45) Date of Patent: Aug. 11, 2020

(54) FIREARM BIPOD

(71) Applicant: Magpul Industries Corp., Austin, TX (US)

(72) Inventors: Timothy Eric Roberts, Broomfield, CO (US); Michael T. Mayberry, Denver, CO (US)

(73) Assignee: Magpul Industries Corp., Austin, TX (US)

( * ) Notice: Subject to any disclaimer, the term of this patent is extended or adjusted under 35 U.S.C. 154(b) by 0 days.

(21) Appl. No.: 16/192,956

(22) Filed: Nov. 16, 2018

(65) Prior Publication Data

US 2019/0086177 A1    Mar. 21, 2019

Related U.S. Application Data

(63) Continuation of application No. 15/851,681, filed on Dec. 21, 2017, now Pat. No. 10,161,706.

(Continued)

(51) Int. Cl.
*F41A 23/10* (2006.01)
*F41A 23/18* (2006.01)
*F16M 11/12* (2006.01)

(52) U.S. Cl.
CPC .............. *F41A 23/10* (2013.01); *F16M 11/12* (2013.01); *F41A 23/18* (2013.01)

(58) Field of Classification Search
CPC ........... F41A 23/10; F41A 23/18; F16M 11/12
(Continued)

(56) References Cited

U.S. PATENT DOCUMENTS

| 179,012 A | * | 6/1876 | Graham | ................ A47C 9/105 108/41 |
| 271,251 A | * | 1/1883 | Leerbech et al. | ....... F41A 23/14 42/94 |

(Continued)

FOREIGN PATENT DOCUMENTS

| EP | 1769214 A1 | 4/2007 |
| EP | 2880352 A1 | 6/2015 |

(Continued)

OTHER PUBLICATIONS

Copenheaver, Blaine, "International Search Report and Written Opinion Regarding PCT/US2017/068136", dated Apr. 25, 2018, p. 13 Published in: WO.

(Continued)

*Primary Examiner* — Michelle Clement
(74) *Attorney, Agent, or Firm* — Neugeboren O'Dowd PC

(57) ABSTRACT

This disclosure describes systems, methods, and apparatus for a bipod having pivot and cant functionality built into a unified cant/pivot assembly, housing, and pivot block. Rotation of a locking knob under the housing can gradually increase or decrease friction of the cant and pivoting degrees of freedom. The legs can be stowed approximately 90° rotation from a deployed position, and locking and releasing of this rotation is made possible via depression of a button that also acts as a locking detent that directly interacts with and locks or releases the legs for rotation. In the stowed position, the button can be backdriven and thus the legs can be deployed without depressing the button. A pivot block can also be raised and rotated 180° to lock in a given pivot setting.

20 Claims, 32 Drawing Sheets

Related U.S. Application Data

(60) Provisional application No. 62/438,590, filed on Dec. 23, 2016.

(58) Field of Classification Search
 USPC .......................................................... 42/94
 See application file for complete search history.

(56) References Cited

U.S. PATENT DOCUMENTS

| | | | | |
|---|---|---|---|---|
| 575,529 | A * | 1/1897 | Stephens | B62H 1/06 280/300 |
| 579,529 | A * | 3/1897 | Bauercamper | E06B 7/18 49/320 |
| 583,656 | A * | 6/1897 | McGrady | B62H 1/06 280/300 |
| 713,114 | A * | 11/1902 | La Force | A45B 5/00 135/66 |
| 721,425 | A * | 2/1903 | Clyde | F41A 23/18 248/170 |
| 1,185,642 | A * | 6/1916 | Emerson | E04H 15/46 108/41 |
| 1,226,554 | A * | 5/1917 | Mante | A47B 3/12 108/128 |
| 1,295,688 | A * | 2/1919 | Butler | F41A 23/08 42/94 |
| 1,355,660 | A * | 10/1920 | Farquhar | F41A 17/56 42/94 |
| 1,382,409 | A * | 6/1921 | Butler | F41A 23/08 248/166 |
| 1,580,406 | A * | 4/1926 | Browning | F41A 23/08 42/94 |
| 2,386,802 | A * | 10/1945 | Johnson, Jr. | F41A 23/00 42/71.01 |
| 2,420,267 | A * | 5/1947 | Sefried | F41A 23/08 403/157 |
| 2,436,349 | A * | 2/1948 | Adams | F41A 23/08 124/29 |
| 2,445,489 | A * | 7/1948 | Mangold | A47C 9/105 108/128 |
| 2,489,283 | A * | 11/1949 | Garand | F41A 23/08 42/94 |
| 2,542,137 | A * | 2/1951 | Hanson | A47F 7/24 126/30 |
| 2,763,456 | A * | 9/1956 | Breer | F16M 11/08 248/155 |
| 2,807,904 | A * | 10/1957 | Kreske | F41A 23/08 42/94 |
| 2,898,137 | A * | 8/1959 | Kreske | F41A 23/08 242/597.3 |
| 3,235,997 | A * | 2/1966 | Stoner | F41A 23/08 42/94 |
| 3,327,422 | A * | 6/1967 | Harris | F41A 23/08 42/94 |
| 3,445,082 | A * | 5/1969 | Frazer | F41A 23/08 248/183.3 |
| 3,464,664 | A * | 9/1969 | Nugent | A47G 25/0664 211/172 |
| D222,118 | S * | 9/1971 | Nakatani | D16/244 |
| 3,618,885 | A * | 11/1971 | Muller | G10G 5/00 211/196 |
| 3,632,073 | A * | 1/1972 | Nakatani | F16M 11/14 248/169 |
| 3,749,431 | A * | 7/1973 | Schmid | B60S 1/24 403/122 |
| 4,010,922 | A * | 3/1977 | Heller | A47C 4/02 248/165 |
| 4,074,881 | A * | 2/1978 | Bickford | A47C 7/004 248/170 |
| 4,098,016 | A * | 7/1978 | Foote | F41A 21/10 42/16 |
| 4,108,412 | A * | 8/1978 | Miller | F16M 11/14 248/179.1 |
| 4,121,799 | A * | 10/1978 | Michio | F16M 11/14 248/171 |
| 4,215,839 | A * | 8/1980 | Gibran | F16M 11/16 248/170 |
| 4,309,010 | A * | 1/1982 | Posso | F16M 11/046 248/166 |
| 4,351,224 | A | 9/1982 | Curtis | |
| 4,470,216 | A * | 9/1984 | Harris | F41A 23/08 42/85 |
| 4,545,660 | A * | 10/1985 | Rudolf | F16M 13/00 248/171 |
| 4,570,887 | A * | 2/1986 | Banister | F16M 11/041 248/187.1 |
| 4,580,483 | A * | 4/1986 | Garbini | F41A 23/12 248/165 |
| 4,625,620 | A * | 12/1986 | Harris | F41A 23/08 42/94 |
| 4,640,481 | A * | 2/1987 | Kohno | F16M 11/10 248/126 |
| 4,641,451 | A * | 2/1987 | Harris | F41A 23/08 42/85 |
| 4,776,124 | A * | 10/1988 | Clifton | F41A 23/08 42/94 |
| 4,807,837 | A * | 2/1989 | Gawlik | A61M 5/1415 211/196 |
| 4,903,425 | A * | 2/1990 | Harris | F16M 13/02 42/94 |
| 4,929,973 | A * | 5/1990 | Nakatani | F16M 11/041 248/177.1 |
| 4,979,709 | A * | 12/1990 | Ishikawa | F16M 11/041 248/187.1 |
| 4,984,090 | A * | 1/1991 | Sasaki | H04N 5/2251 348/376 |
| 5,029,407 | A * | 7/1991 | Kirkpatrick | F41A 23/10 42/94 |
| 5,060,894 | A * | 10/1991 | Hillinger | F16C 11/10 211/203 |
| 5,074,118 | A | 12/1991 | Harris | |
| 5,074,188 | A * | 12/1991 | Harris | F41A 23/08 42/94 |
| 5,081,478 | A * | 1/1992 | Hayashida | F16M 11/10 248/187.1 |
| 5,082,218 | A * | 1/1992 | Hoffman | A63B 55/57 248/96 |
| 5,102,079 | A * | 4/1992 | Lee | F16M 11/16 248/166 |
| 5,194,678 | A * | 3/1993 | Kramer | F16M 11/16 42/94 |
| 5,213,296 | A * | 5/1993 | Lee | F16M 11/16 248/166 |
| 5,222,705 | A * | 6/1993 | Gibran | F16M 11/04 248/170 |
| 5,345,706 | A * | 9/1994 | Brown | F41A 23/06 42/94 |
| 5,384,609 | A * | 1/1995 | Ogawa | F16M 11/28 396/419 |
| 5,407,155 | A * | 4/1995 | Chung | A63B 55/57 248/96 |
| 5,421,549 | A * | 6/1995 | Richards | F16M 11/10 248/163.2 |
| 5,425,315 | A * | 6/1995 | Huggins | A47B 3/00 108/115 |
| 5,438,786 | A * | 8/1995 | Hilderbrand | F41A 23/14 248/171 |
| 5,547,162 | A * | 8/1996 | Sobolewski | F41B 5/14 124/88 |
| 5,692,654 | A * | 12/1997 | Bell | F41C 23/02 224/150 |
| 5,711,103 | A * | 1/1998 | Keng | F41A 23/08 42/94 |
| 5,746,407 | A * | 5/1998 | Nakatani | F16M 11/18 248/168 |
| 5,852,892 | A * | 12/1998 | Bilgeri | F41A 23/08 42/94 |

(56) References Cited

U.S. PATENT DOCUMENTS

| | | | |
|---|---|---|---|
| 5,857,279 A * | 1/1999 | de Oliveira Masina | F41C 23/10 42/71.01 |
| 5,930,933 A * | 8/1999 | Schleicher | F41A 23/16 42/94 |
| 6,050,531 A * | 4/2000 | Wilcox | A47B 19/002 248/188.5 |
| 6,079,682 A | 6/2000 | Olkkola | |
| 6,254,044 B1 * | 7/2001 | Lee | F16M 11/14 248/163.1 |
| 6,289,622 B1 * | 9/2001 | Desch, Jr. | F41A 23/10 42/94 |
| 6,305,116 B1 * | 10/2001 | Parker | F41A 23/04 42/94 |
| 6,315,256 B1 * | 11/2001 | Tolar | F41A 23/00 248/230.4 |
| 6,397,507 B1 * | 6/2002 | Marshall | F41C 23/16 42/106 |
| 6,445,498 B1 * | 9/2002 | Baun | G02B 23/16 359/429 |
| 6,487,807 B1 * | 12/2002 | Kopman | F41A 23/12 42/72 |
| 6,539,660 B1 * | 4/2003 | Yeargin | F41A 23/10 42/94 |
| 6,629,380 B2 * | 10/2003 | Yeargin | F41A 23/10 42/94 |
| 6,658,781 B1 * | 12/2003 | Bowen | F41C 23/12 42/71.02 |
| 6,763,627 B1 * | 7/2004 | Kaempe | F41A 23/10 42/94 |
| 6,773,110 B1 * | 8/2004 | Gale | F16M 13/04 348/211.4 |
| 6,785,997 B2 | 9/2004 | Oz | |
| 6,829,857 B1 * | 12/2004 | Houtsma | F41A 23/10 248/532 |
| 6,843,015 B2 | 1/2005 | Sharp | |
| 7,032,494 B2 * | 4/2006 | Wygant | F41A 23/08 248/171 |
| 7,121,034 B2 | 10/2006 | Keng | |
| 7,143,986 B1 * | 12/2006 | Austin | F41A 23/08 248/187.1 |
| 7,191,557 B2 * | 3/2007 | Gablowski | F41C 23/16 42/72 |
| 7,197,844 B2 * | 4/2007 | Benson | F41A 23/08 248/593 |
| 7,222,451 B2 * | 5/2007 | Keng | F41A 23/08 42/127 |
| 7,243,454 B1 * | 7/2007 | Cahill | F41C 23/12 42/72 |
| 7,243,455 B2 * | 7/2007 | Jurk | F41A 23/10 42/94 |
| 7,401,431 B2 | 7/2008 | Pierce et al. | |
| 7,421,815 B1 * | 9/2008 | Moody | F41C 23/16 248/171 |
| 7,421,817 B2 * | 9/2008 | Larsson | F41G 1/35 42/127 |
| 7,426,800 B2 | 9/2008 | Pierce | |
| 7,430,828 B2 * | 10/2008 | Munst | F41G 11/003 42/72 |
| 7,431,247 B2 * | 10/2008 | Bobro | F41A 23/10 248/176.1 |
| 7,464,495 B2 | 12/2008 | Cahill | |
| 7,478,496 B2 * | 1/2009 | Bender | F41A 23/10 248/176.1 |
| 7,520,083 B2 * | 4/2009 | Dextraze | F41G 1/393 42/124 |
| 7,571,563 B2 * | 8/2009 | Peterson | F41A 23/08 248/165 |
| 7,584,568 B1 * | 9/2009 | Brownlee | F41A 23/12 42/94 |
| 7,614,174 B1 * | 11/2009 | Beltz | F41A 23/10 42/72 |
| 7,631,455 B2 | 12/2009 | Keng et al. | |
| 7,676,977 B1 * | 3/2010 | Cahill | F16M 11/16 248/168 |
| 7,770,320 B1 * | 8/2010 | Bartak | F41C 23/16 42/72 |
| 7,774,972 B2 | 8/2010 | Potterfield et al. | |
| 7,779,572 B2 | 8/2010 | Potterfield et al. | |
| 7,793,454 B1 | 9/2010 | Beltz | |
| 7,797,875 B1 * | 9/2010 | Carrier | F41G 11/003 211/85.7 |
| 7,823,316 B2 * | 11/2010 | Storch | F41G 11/003 42/127 |
| 7,845,267 B2 * | 12/2010 | Potterfield | F41G 11/004 89/37.04 |
| 7,856,748 B1 * | 12/2010 | Mertz | F41A 23/08 42/71.01 |
| 7,861,451 B1 | 1/2011 | Moody et al. | |
| 7,954,272 B2 | 6/2011 | Potterfield et al. | |
| 7,959,123 B1 * | 6/2011 | Kitscha | F16M 11/041 248/168 |
| 7,987,623 B1 * | 8/2011 | Moody | F41A 23/08 42/71.01 |
| 8,028,457 B2 | 10/2011 | Moody et al. | |
| 8,104,213 B2 * | 1/2012 | Keng | F41A 23/10 42/94 |
| 8,104,214 B2 * | 1/2012 | Boord | F41A 23/02 108/115 |
| 8,136,284 B2 | 3/2012 | Moody et al. | |
| 8,156,678 B2 * | 4/2012 | Hoel | F41G 11/003 42/124 |
| 8,327,570 B2 | 4/2012 | Potterfield et al. | |
| 8,291,633 B1 * | 10/2012 | Hass | F41A 23/10 42/72 |
| 8,316,570 B2 | 11/2012 | Pottertield et al. | |
| 8,341,864 B2 * | 1/2013 | Moody | F41A 23/08 42/72 |
| 8,341,865 B2 | 1/2013 | Moody et al. | |
| 8,341,866 B1 * | 1/2013 | Gaddini | F41G 11/003 42/71.01 |
| 8,359,702 B2 * | 1/2013 | Powell, Jr. | B60S 1/24 15/250.27 |
| 8,359,780 B2 * | 1/2013 | Peterson | F41G 11/003 42/94 |
| 8,393,104 B1 * | 3/2013 | Moody | F41C 23/14 42/71.01 |
| 8,402,684 B1 * | 3/2013 | Beltz | F41A 23/10 42/72 |
| 8,418,394 B2 | 4/2013 | Keng | |
| 8,438,773 B2 * | 5/2013 | Carlson | F41G 11/008 42/125 |
| 8,443,540 B2 | 5/2013 | Poling | |
| 8,448,369 B2 * | 5/2013 | Hinds, Jr. | F41A 23/08 42/94 |
| 8,458,946 B1 * | 6/2013 | Pintsch | F41A 23/08 42/90 |
| 8,464,628 B2 | 6/2013 | Potterfield et al. | |
| 8,496,212 B2 * | 7/2013 | Keng | F41A 23/10 211/203 |
| 8,505,229 B2 * | 8/2013 | Savoy | F41G 11/003 42/128 |
| 8,567,106 B2 * | 10/2013 | Chvala | F41A 23/10 248/169 |
| 8,578,647 B2 * | 11/2013 | Storch | F41C 27/00 248/187.1 |
| 8,607,491 B2 * | 12/2013 | Moody | F41C 23/16 42/72 |
| 8,857,094 B2 * | 10/2014 | Michel | F41C 23/14 42/71.01 |
| 8,863,430 B2 | 10/2014 | Poling | |
| 8,869,442 B2 | 10/2014 | Moody et al. | |
| 8,894,024 B2 * | 11/2014 | Deros | F16M 11/041 248/124.1 |
| 8,904,693 B1 | 12/2014 | Beltz | |
| 9,015,980 B2 | 4/2015 | Shull | |
| 9,121,665 B2 * | 9/2015 | Hinds | F41A 23/04 |
| 9,255,751 B1 * | 2/2016 | Beltz | F41A 23/10 |
| 9,298,066 B1 * | 3/2016 | Fan | G03B 17/561 |

(56) References Cited

U.S. PATENT DOCUMENTS

| | | | |
|---|---|---|---|
| 9,303,940 B2 | 4/2016 | Bonelli et al. | |
| 9,354,012 B2* | 5/2016 | Faifer | F41A 23/10 |
| 9,377,274 B2* | 6/2016 | Kincel | F41C 23/16 |
| 9,410,762 B2 | 8/2016 | Ballard | |
| 9,435,601 B2 | 9/2016 | Poling | |
| 9,470,468 B2* | 10/2016 | McGinty | F41C 23/16 |
| D785,126 S | 4/2017 | Barrett | |
| 9,810,974 B2 | 11/2017 | Chi | |
| 9,949,470 B2* | 4/2018 | Paczesny | A01K 97/12 |
| 10,012,465 B1* | 7/2018 | Liechty | F41A 23/10 |
| 10,168,119 B2* | 1/2019 | Roberts | F41A 23/10 |
| 10,295,292 B2* | 5/2019 | Ding | F41A 23/02 |
| 10,420,407 B2* | 9/2019 | Whitten | B60R 11/00 |
| 2003/0081953 A1* | 5/2003 | Wei | G03B 17/00 396/428 |
| 2003/0192223 A1* | 10/2003 | Sharp | F41A 23/10 42/94 |
| 2003/0205653 A1* | 11/2003 | Peterson | A01M 31/02 248/286.1 |
| 2003/0226941 A1* | 12/2003 | Crain | F16B 7/1463 248/166 |
| 2004/0060222 A1* | 4/2004 | Oz | F41G 1/35 42/146 |
| 2005/0151040 A1* | 7/2005 | Hsu | B62J 11/00 248/214 |
| 2005/0188588 A1* | 9/2005 | Keng | F41A 23/10 42/72 |
| 2005/0207749 A1* | 9/2005 | Barker | F16M 11/14 396/428 |
| 2005/0241206 A1* | 11/2005 | Teetzel | F41A 23/08 42/72 |
| 2005/0242250 A1* | 11/2005 | Keng | F16M 11/10 248/168 |
| 2006/0010748 A1* | 1/2006 | Stoner | F41C 27/00 42/71.01 |
| 2006/0086871 A1* | 4/2006 | Joseph | F16M 11/041 248/178.1 |
| 2006/0156609 A1* | 7/2006 | Kim | F41G 11/003 42/124 |
| 2006/0239677 A1* | 10/2006 | Friedrich | F16M 11/043 396/419 |
| 2006/0248774 A1* | 11/2006 | Pierce | F41A 23/10 42/94 |
| 2007/0090237 A1* | 4/2007 | Hsu | F16M 11/14 248/178.1 |
| 2007/0271834 A1* | 11/2007 | Keng | F41G 11/003 42/124 |
| 2008/0052979 A1* | 3/2008 | Lee | F41A 23/04 42/94 |
| 2008/0134560 A1* | 6/2008 | Pierce | F41A 23/08 42/94 |
| 2008/0295379 A1* | 12/2008 | Potterfield | F41A 23/10 42/94 |
| 2009/0000175 A1* | 1/2009 | Potterfield | F41A 23/10 42/94 |
| 2009/0056192 A1* | 3/2009 | Oz | F41A 23/08 42/94 |
| 2009/0133309 A1 | 5/2009 | Cahill | |
| 2009/0193702 A1* | 8/2009 | Lin | F41C 23/16 42/72 |
| 2009/0313873 A1* | 12/2009 | Roth | F41C 23/16 42/72 |
| 2010/0019109 A1* | 1/2010 | Liu | F16M 11/046 248/168 |
| 2010/0107467 A1* | 5/2010 | Samson | F41G 11/003 42/127 |
| 2010/0162611 A1* | 7/2010 | Samson | F41G 1/18 42/125 |
| 2010/0205795 A1* | 8/2010 | Moody | F41A 23/08 29/428 |
| 2010/0218411 A1* | 9/2010 | Keng | F41A 23/10 42/94 |
| 2010/0225803 A1* | 9/2010 | Matsuhashi | F16M 11/10 348/373 |
| 2010/0263256 A1* | 10/2010 | Spinelli | F41G 11/003 42/124 |
| 2011/0036236 A1 | 2/2011 | Potterfield et al. | |
| 2011/0047850 A1* | 3/2011 | Rievley | F41C 23/16 42/72 |
| 2011/0047851 A1* | 3/2011 | Mock | F41C 23/16 42/72 |
| 2011/0047855 A1* | 3/2011 | Wong | F41G 11/002 42/124 |
| 2011/0099873 A1* | 5/2011 | Bentley | F41C 23/16 42/71.01 |
| 2011/0099878 A1 | 5/2011 | Moody et al. | |
| 2011/0188847 A1* | 8/2011 | McKay | F16M 11/041 396/421 |
| 2012/0174459 A1* | 7/2012 | Poling | F41A 23/08 42/94 |
| 2012/0266513 A1* | 10/2012 | Gnesda | F41A 23/08 42/72 |
| 2012/0272557 A1* | 11/2012 | Yan | F41C 23/12 42/69.01 |
| 2013/0026315 A1* | 1/2013 | Lee | F16M 11/16 248/168 |
| 2013/0121680 A1* | 5/2013 | Chen | F16M 11/16 396/428 |
| 2013/0193288 A1* | 8/2013 | Congdon | F16M 11/14 248/231.41 |
| 2013/0205639 A1* | 8/2013 | Poling | F41A 23/10 42/94 |
| 2014/0115940 A1* | 5/2014 | Bonelli | F16M 11/14 42/94 |
| 2014/0130393 A1* | 5/2014 | Antell | F41A 23/10 42/94 |
| 2014/0190059 A1* | 7/2014 | Ballard | F41C 23/16 42/94 |
| 2014/0224114 A1* | 8/2014 | Faxon | F41A 15/14 89/193 |
| 2015/0076296 A1* | 3/2015 | Yang | F16M 11/041 248/163.2 |
| 2015/0135577 A1 | 5/2015 | Poling | |
| 2015/0362278 A1* | 12/2015 | Genchel | F41A 23/10 42/94 |
| 2016/0116245 A1* | 4/2016 | Ravnaas | F41A 23/08 42/71.01 |
| 2016/0209172 A1* | 7/2016 | Trotabas | F41G 1/44 |
| 2016/0273863 A1* | 9/2016 | Hayes | F41A 23/08 |
| 2017/0138692 A1* | 5/2017 | Tubb | F41C 23/16 |
| 2017/0146891 A1* | 5/2017 | Chen | G03B 17/561 |
| 2017/0192344 A1* | 7/2017 | Chi | G03B 17/561 |
| 2018/0058794 A1* | 3/2018 | Scalf | F41A 23/10 |
| 2018/0156378 A1* | 6/2018 | Hatch | F16M 11/26 |
| 2018/0180374 A1* | 6/2018 | Roberts | F41A 23/10 |
| 2018/0180375 A1* | 6/2018 | Macken | F16M 11/26 |
| 2018/0187830 A1* | 7/2018 | Gearing | F16M 11/041 |
| 2018/0216907 A1* | 8/2018 | Roberts | F41A 23/10 |
| 2018/0259287 A1* | 9/2018 | Palu | F41A 23/10 |
| 2018/0274716 A1* | 9/2018 | Kallas | F16M 11/041 |
| 2019/0154394 A1* | 5/2019 | Eccleshall | F41A 23/10 |
| 2019/0203760 A1* | 7/2019 | Cladiere | F16C 7/06 |

FOREIGN PATENT DOCUMENTS

| | | |
|---|---|---|
| EP | 2956705 A1 | 12/2015 |
| WO | 2013132291 A1 | 9/2013 |
| WO | 2016161059 A1 | 10/2016 |

OTHER PUBLICATIONS

Kato, Shinju, "Office Action Regarding Japanese Patent Application No. 2018-013701", dated Dec. 12, 2018, p. 2 Published in: JP.

Versa Pod, "150-051 Versa-Pod Model 51 Bipod 50 Series Gun Rest With Pan Tilt & Lock Controls 7 to 9 and Rubber Feet.", "Retrieved from https://www.amazon.com/150-051-Versa-Pod-Model-Controls-Rubber/dp/B000FAB331", Sep. 26, 2016, p. 6.

(56) References Cited

OTHER PUBLICATIONS

ACCU-TAC, "SR-5", "Retrieved from http://www.accu-tac.com/product/sr-5-bipod/", Sep. 26, 2016, p. 3.
B&T Industries, LLC, "Atlas Bipods", "Retrieved from http://www.accu-shot.com/Atlas_Bipods.php", Sep. 26, 2016, p. 1.
Bobro Engineering, "Bi-Pod Type 3-Blac", "Retrieved from http://www.bobroengineering.com/view/product/1/", Sep. 26, 2016, p. 2.
Leapers, Inc., "Bipods and Shooting Stands", "Retrieved from http://www.leapers.com/index.php?mitem=bipod&mtrack=m", Sep. 26, 2016, p. 1.
Brownells, Inc., "GPS, LLC.—Military Model Grip Pod Picatinny Mount", "Retrieved from https://www.brownells.com/shooting-accessories/bipods-monopods-amp-accessories/bipod-accessories/grip-pod-gps-02-military-model-prod244", Sep. 26, 2016, p. 2.
Battenfeld Technologies, Inc., "Caldwell Shooting Bipod", "Retrieved from https://www.btibrands.com/product/shooting-bipod/", Sep. 26, 2016, p. 2.
Vanguard, "Equalizer Pro 2", "Retrieved from https://www.vanguardworld.us/hunting_us/products/support-systems/equalizer-pro-2.html#go-sectionTop", Sep. 26, 2016, p. 5.
Fab Defense, "H-Pod", "Retrieved from https://www.fab-defense.com/en/category-bipods/id-774/harris-bipod-tilting-rotating-picatinny-adaptor-.html", Sep. 26, 2016, p. 1.
Harris Bipods, "Harris Bipods and Adapters", "Retrieved from http://www.harrisbipods.com/", Sep. 26, 2016, p. 8.
hkparts.net, "HK German Rifle All Steel Bipod—for Use With the HK Wide Forearm", "Retrieved from http://www.hkparts.net/shop/pc/HK-German-All-Steel-Bipod-G3-91-93-33-p215.htm", Sep. 26, 2016, p. 2.
boltcarrier.com, "Knight's Armament (KAC) KAC Bi Pod Assembly", "Retrieved from https://www.boltcarrier.com/product/kac-bi-pod/", Sep. 26, 2016, p. 1.
Military Advantage, "M249 Squad Automatic Weapon", "Retrieved from https://www.military.com/equipment/m249-squad-automatic-weapon", Sep. 26, 2016, p. 2.
Sarco, Inc., "M60 US GI Bipod", "Retrieved from http://www.e-sarcoinc.com/m60bipod.aspx", Sep. 26, 2016, p. 2.
Mystic Precision, "MPOD", "Retrieved from http://mysticprecision.com/mpod/", Sep. 26, 2016, p. 3.
CAA, "NBPS Bottom Rail Mounting Short Bipod Picatinny", "Retrieved from https://usa.caagearup.com/nbps-bottom-rail-mounting-short-bipod-picatinny", Oct. 10, 2016, p. 4.
Fidelis Firearms, "Parker-Hale Bipods", "Retrieved from http://fidelisfirearms.com/bipods/", Sep. 26, 2016, p. 1.
KFS Industries, Inc., "S7 Bipods", "Retrieved from http://s7bipod.com/", Sep. 26, 2016, p. 2.
Midwest Gun Works, Inc., "SAKO TRG 22/42 Bipod", "Retrieved from https://www.midwestgunworks.com/page/mgwi/prod/S5740495?", Sep. 26, 2016, p. 2.
Blackhawk!, "Sportster Traversetrack Bipod", "Retrieved from https://blackhawk.com/products/long-gun-accessories/long-gun-accessories/bipods/sportster-traversetrack-bipod", Sep. 26, 2016, p. 7.
GG&G, "Standard XDS Bipod", "Retrieved from http://www.gggaz.com/standard-xds-swivel-bipod.html", Sep. 26, 2016, p. 4.
The Mako Group, "Tactical Vertical Foregrip With Integrated Adjustable Bipod—GEN 2—T-PODG2QR", "Retrieved from https://www.themakogroup.com/foregrips/tactical-vertical-foregrip-with-integrated-adjustable-bipod-gen-2-t-podg2qr.html", Sep. 26, 2016, p. 4.
The Mako Group, "Tavor Quick Deployment Bipod", "Retrieved from https://www.themakogroup.com/tavor-quick-deployment-bipod-4462.html", Sep. 26, 2016, p. 3.
Tiptop Bipod, "Tiptop EZ Pivot & Pan Rifle Bipod 6-9: Sling Stud Mount: Extendable, Folding, with Sling-Attached Hole PN# S7-74667", "Retrieved from https://www.amazon.com/Tiptop%C2%AE-Pivot-Rifle-Bipod-Sling-attached/dp/B00QJ67A1Q", Sep. 26, 2016, p. 8.
KFS Industries, Inc., "Versa-Pod", "Retrieved from http://stores.versapod.com/", Sep. 26, 2016, p. 2.

\* cited by examiner

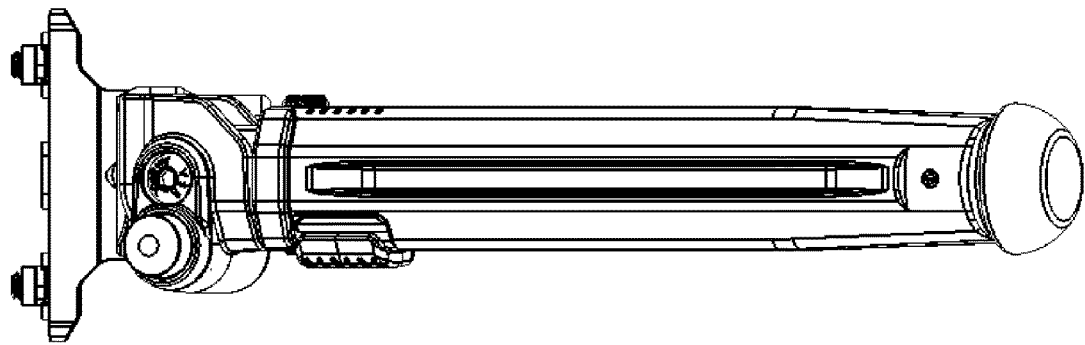
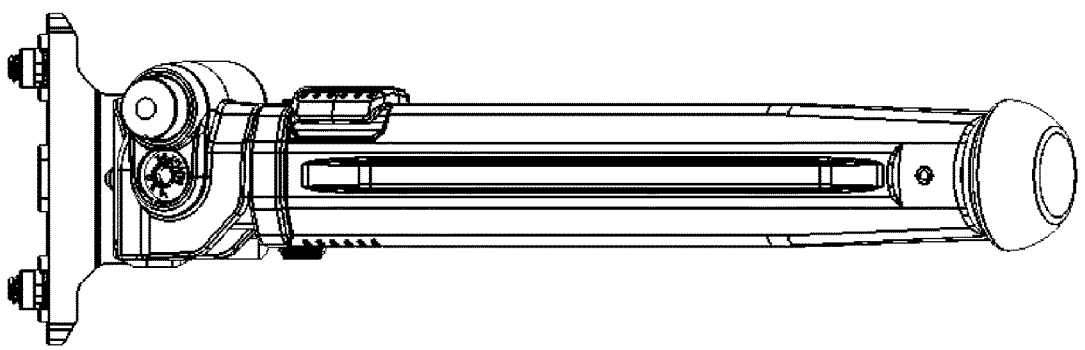
FIG. 5

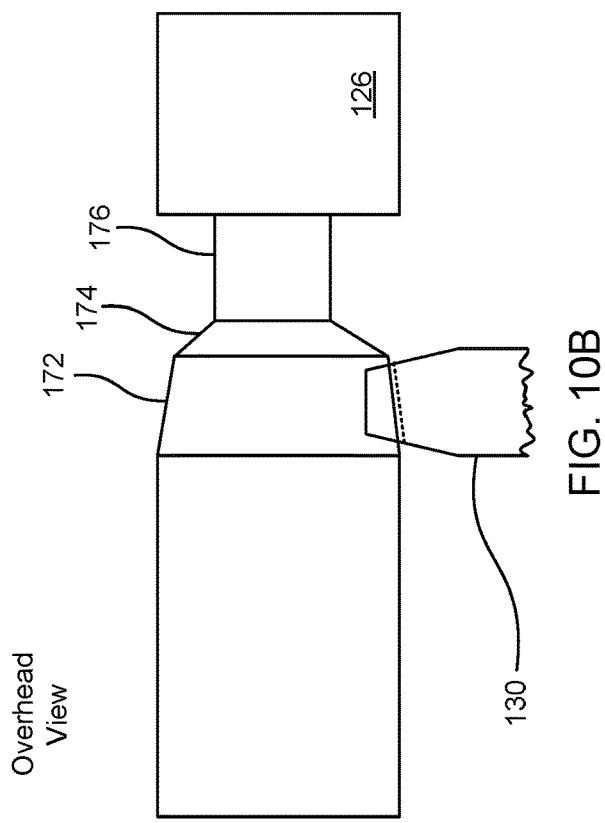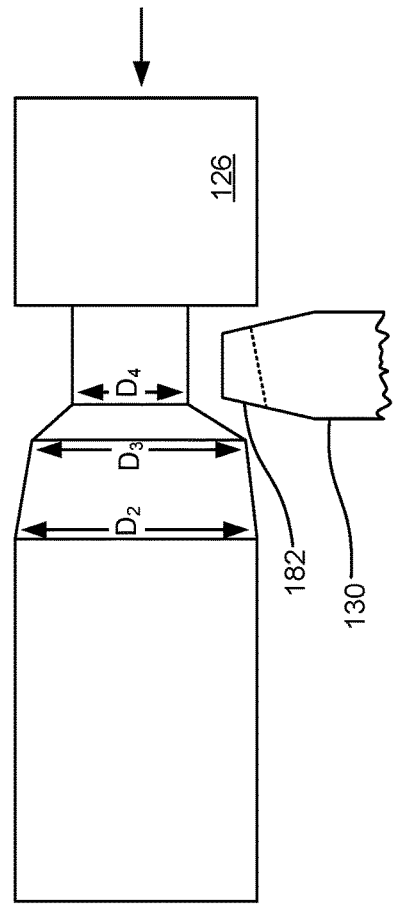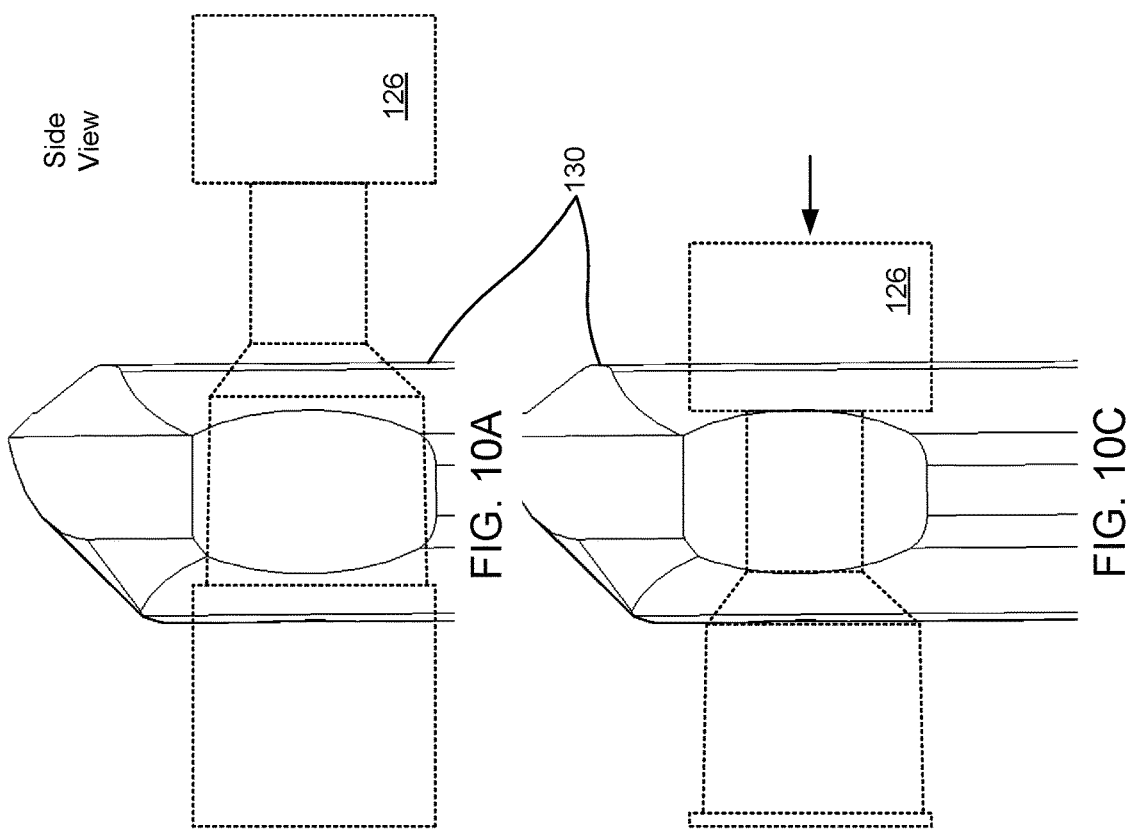

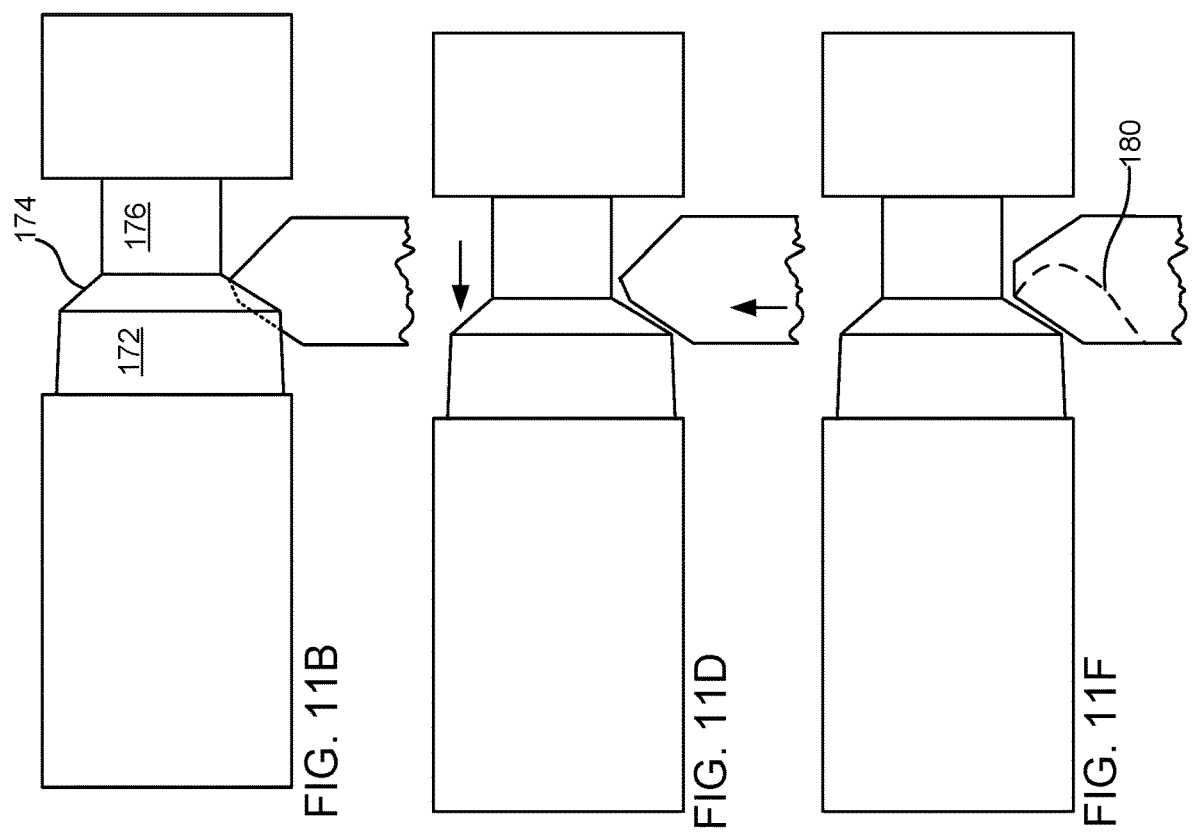
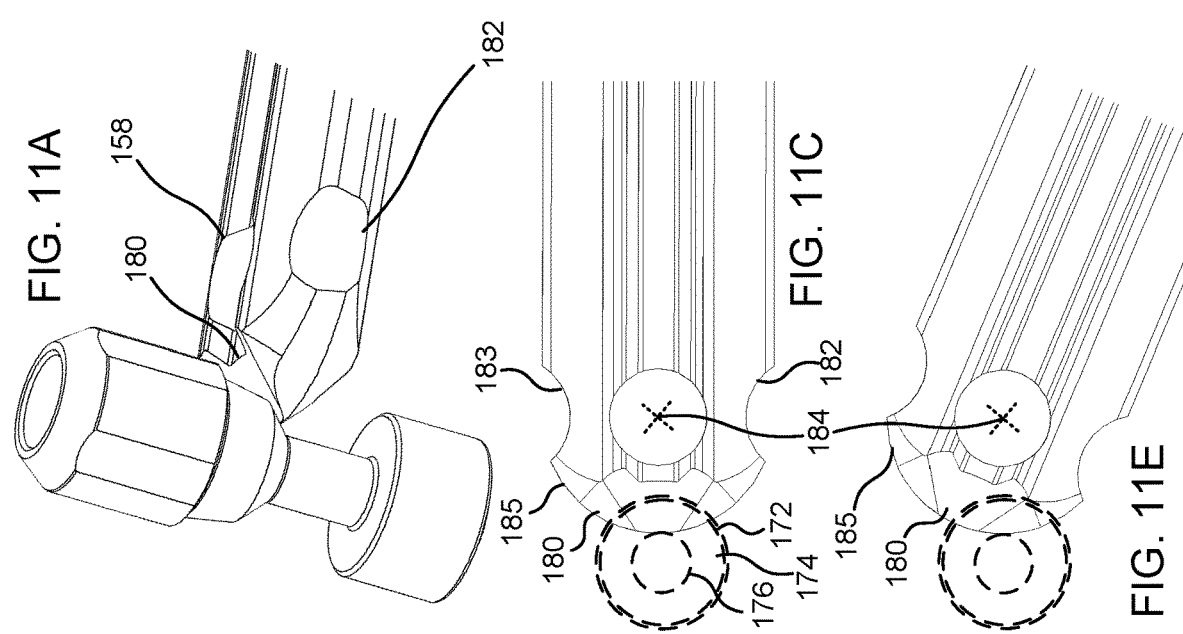

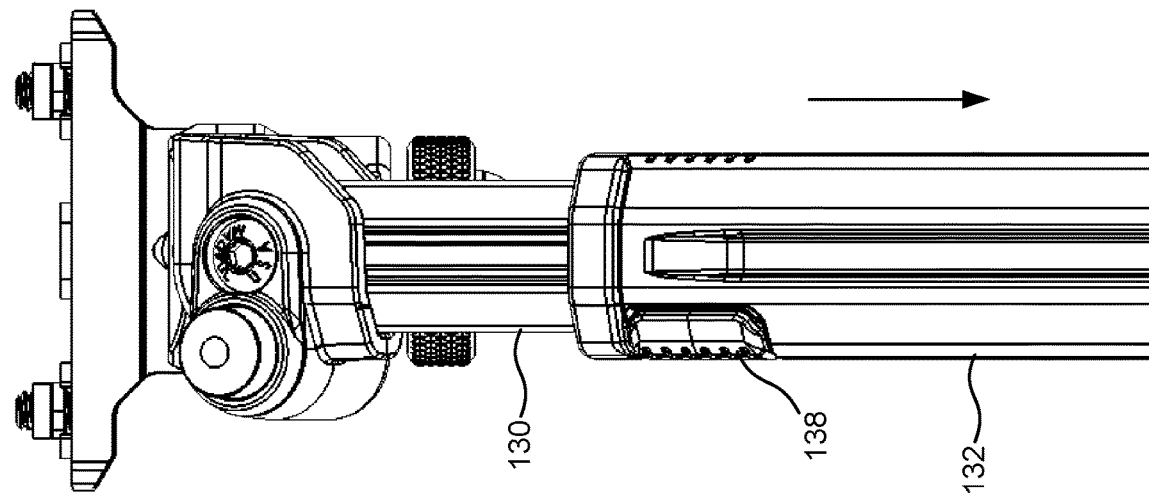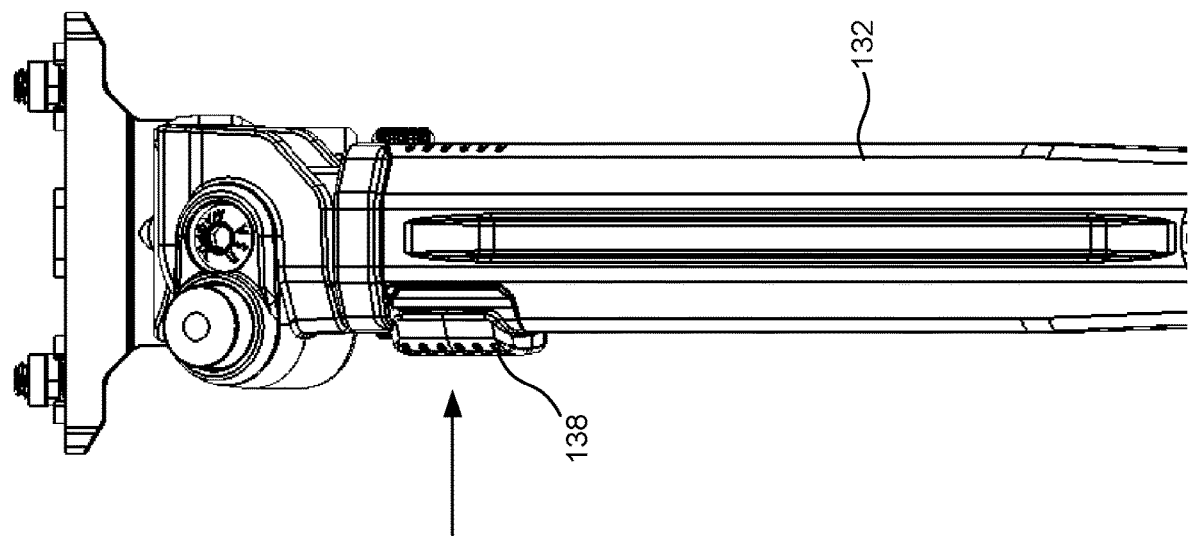
FIG. 13

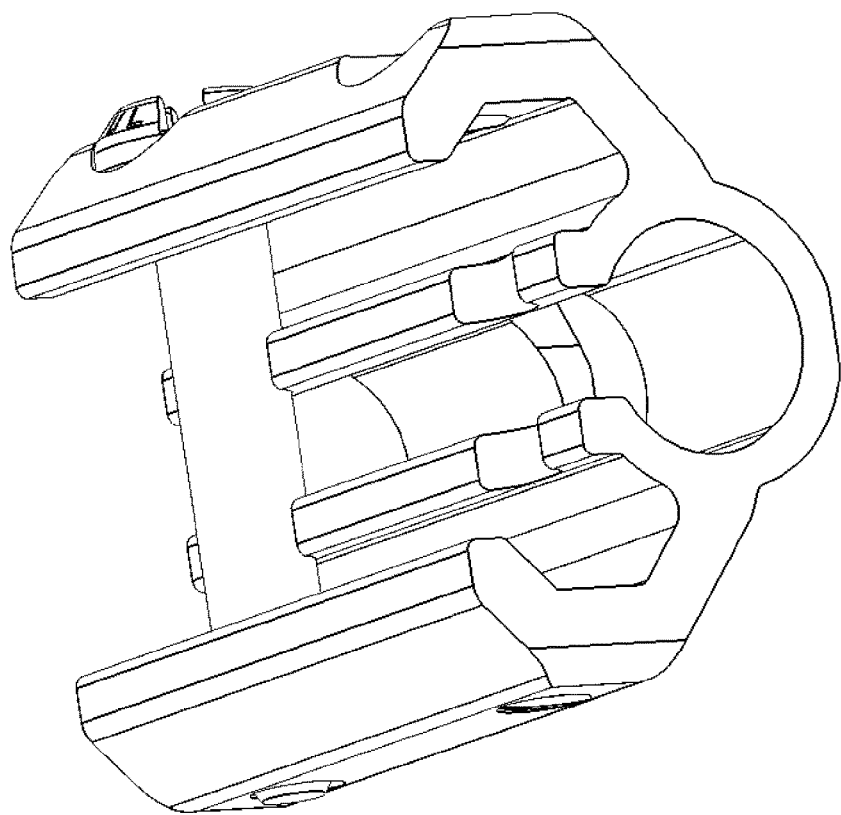
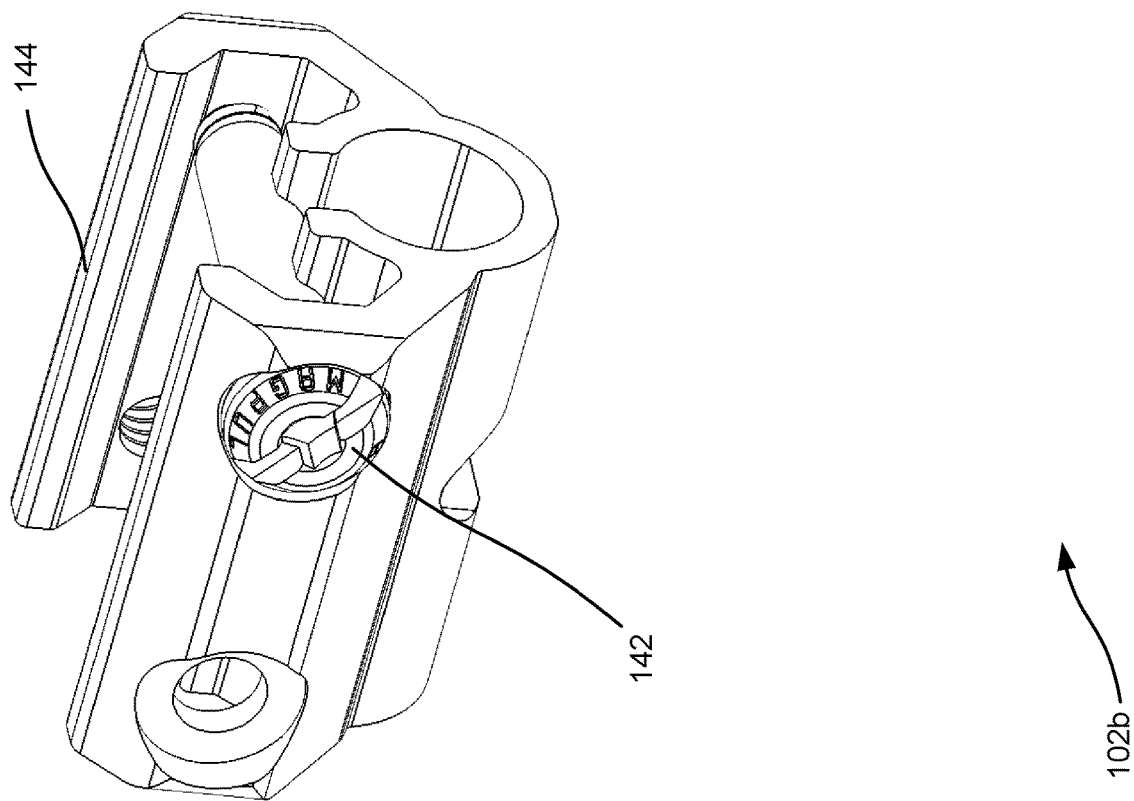
FIG. 24

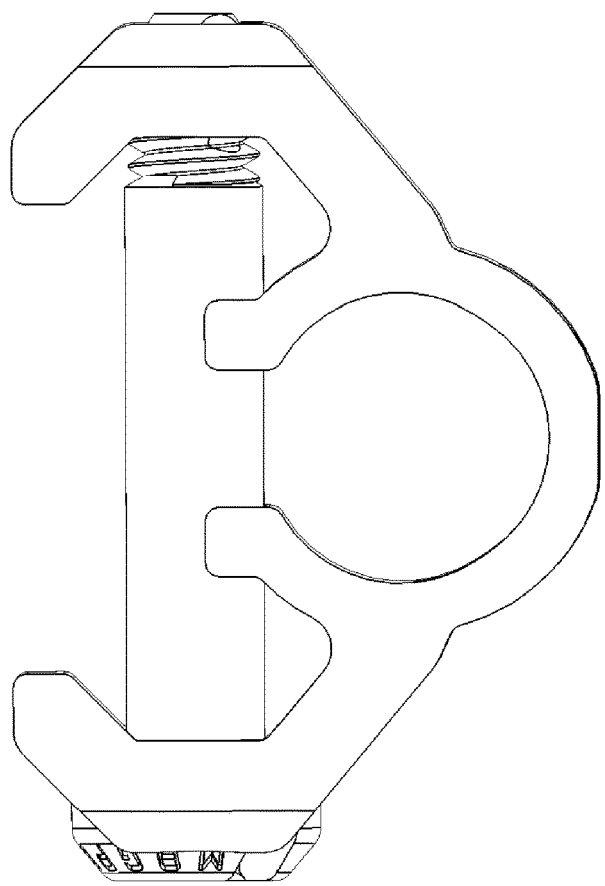
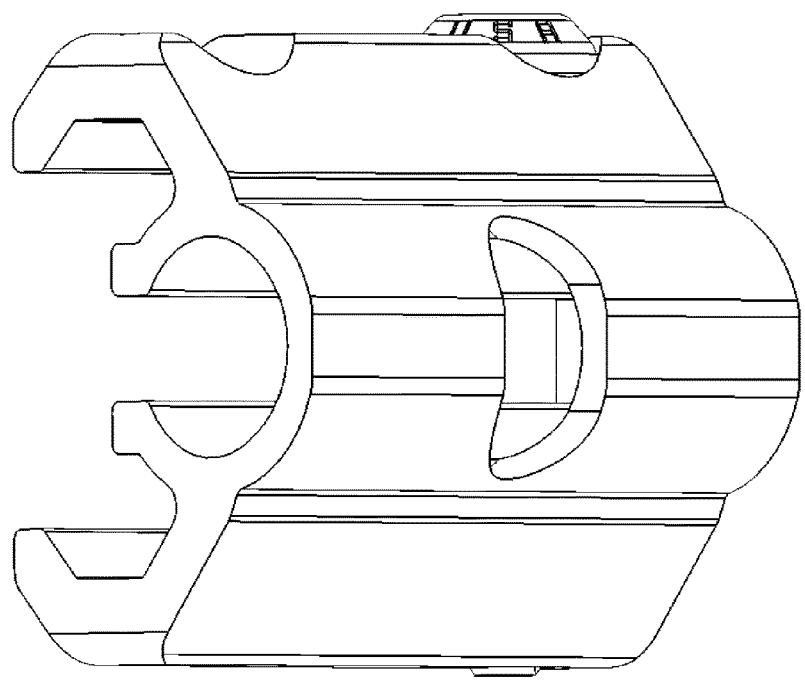
FIG. 25

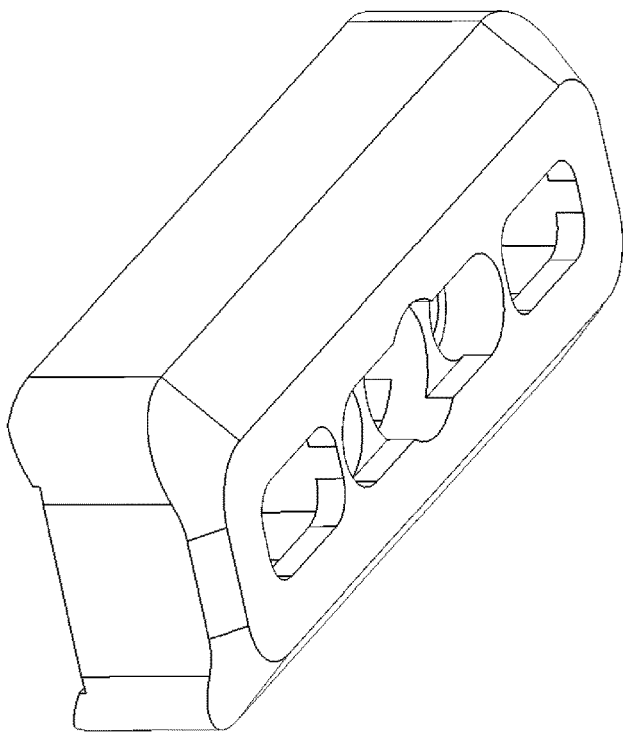
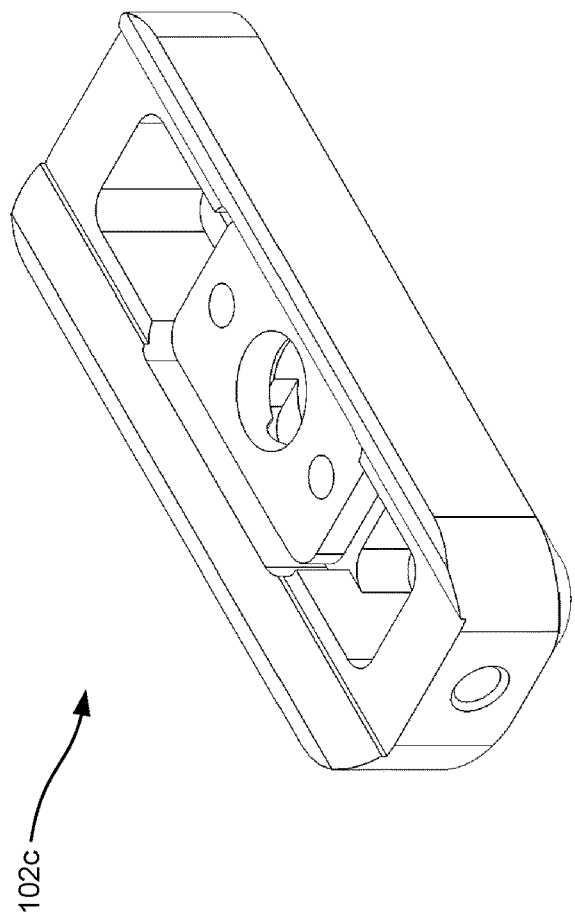
FIG. 26

Locked State

Unlocked State

FIREARM BIPOD

CLAIM OF PRIORITY UNDER 35 U.S.C. § 120

The present Application for Patent is a Continuation of patent application Ser. No. 15/851,681 entitled "FIREARM BIPOD" filed Dec. 21, 2017, which claims priority to Provisional Application No. 62/438,590 entitled "FIREARM BIPOD" filed Dec. 23, 2016, and assigned to the assignee hereof and hereby expressly incorporated by reference herein.

FIELD OF THE DISCLOSURE

The present disclosure relates generally to firearm accessories. In particular, but not by way of limitation, the present disclosure relates to systems, methods and apparatuses for a firearm bipod configured to cant, pivot, and fold.

DESCRIPTION OF RELATED ART

Modern firearms, such as rifles in particular, may be more accurately and conveniently fired by the shooter if the firearm is equipped with a bipod device for supporting and steadying the barrel. Bipods may be fixedly or removably mounted onto firearms, and have been found to be most convenient if they can further be retracted in a storage position when not in use. Exemplary bipods and mounting devices are taught in prior U.S. Pat. No. 3,327,422 issued Jun. 27, 1967; U.S. Pat. No. 4,470,216 issued Sep. 11, 1984; U.S. Pat. No. 4,625,620 issued Dec. 2, 1986; and U.S. Pat. No. 4,641,451 issued Feb. 10, 1987; U.S. Pat. No. 4,903,425 issued Feb. 27, 1990; and U.S. Pat. No. 5,711,103 issued Jan. 27, 1998, and U.S. Pat. No. 7,779,572 issued Aug. 24, 2010, the disclosures of which are incorporated herein by reference in their entirety.

However, existing bipods may not have both a cant and pivot feature, and if they do they tend to require separate controls for each degree of freedom. Further, the complexity of bipods tends to make them bulky and adds weight to a firearm. Nor do existing bipods offer a simple means to adjust tension of pivot and cant adjustment.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a bipod leg deployment assembly. The assembly can include a housing, a leg housing, a leg assembly, a leg deployment pivot axis, and a bipod leg deployment button. The leg assembly can have a deployed position and a stowed position, these two positions having an arcuate separation of at least 45° (for instance 90°). The leg assembly can rotate around the leg deployment pivot axis when moved from a deployed state to a stowed state, or vice versa. The bipod leg deployment button can be arranged near, but not coincident with the leg deployment pivot axis, and can be biased outward form the housing. The bipod leg deployment button can include an elongated and cylindrical cross section split into at least two lengths, the lengths extending along a longitudinal axis of the bipod leg deployment button. A first of the at least two lengths being a conical frustum with sides angled from the longitudinal axis by an angle selected from the range including and extending between 0° and 30°, and at least a first diameter at the narrowest end of the conical frustum. A second of the lengths can have a second diameter, smaller than the first diameter.

Other embodiments of the disclosure may also be characterized as a bipod leg deployment button. The button can include an elongated and cylindrical cross section split into at least two lengths. The lengths can extend along a longitudinal axis of the bipod leg deployment button. A first of the lengths can be a conical frustum with sides angled from the longitudinal axis by an angle selected from the range including and extending between 0° and 30°, and at least a first diameter at a narrowest end of the conical frustum. A second of the lengths can have a second diameter, smaller than the first diameter.

Other embodiments of the disclosure can be characterized as a method deploying a bipod leg. The method can include biasing the bipod leg deployment button away from a bipod housing into a locked state. The method can further include providing a first length of the bipod leg deployment button being a conical frustum, the conical frustum narrowing as the first length extends away from the housing, the angle of this narrowing having a first value. The method may further include providing a first conical cutout in a leg assembly near a leg deployment pivot axis of the leg assembly, the first conical cutout shaped to interface with the first length of the bipod leg deployment button such that the leg assembly is unable to rotate when the bipod leg deployment button is in the locked state. The method may yet further include depressing the bipod leg deployment button toward the housing into an unlocked state such that the first conical cutout and the first length no longer interface. The method may also include rotating the leg assembly from the deployed position toward a stowed position.

Yet further embodiments of the disclosure can be characterized as a bipod leg deployment assembly. The assembly can include a housing, a leg housing, at least one leg assembly, at least one leg deployment pivot axis, and at least one leg release button. Each leg assembly can have a deployed position and a stowed position, and these two positions can have an arcuate separation of at least 45°, or at least 60°, or at least 85° or at least 90°. The leg assembly can rotate around the leg deployment pivot axis when the leg assembly is moved from the deployed position to the stowed position, or from the stowed position to the deployed position. The leg release button can be arranged near, but not coincident with the leg deployment pivot axis. The leg release button can also be biased outward from the housing and can have a locked state and an unlocked state. In the unlocked state, the leg release button is closer to the housing than when it is in the locked state. When the leg assembly is in the deployed position, the leg release button is shaped to: in the locked state, prevent rotation of the leg assembly toward the stowed position; and in the unlocked state, allow rotation of the leg assembly toward the stowed position. When the leg assembly is in the stowed position, the leg release button is shaped to: in the locked state, prevent rotation of the leg assembly toward the deployed position when less than a threshold torque is applied to the leg assembly; and in the locked state, allow rotation of the leg assembly toward the deployed position when the threshold torque, or more, is applied to the leg assembly.

BRIEF DESCRIPTION OF THE FIGURES

FIG. 5 illustrates side views of the bipod of FIG. 1;

FIG. 10A illustrates a cross-sectional side view of the interaction between a first length of a leg release button and a first conical cutout of an inner leg portion of a leg assembly;

FIG. 10B illustrates an overhead view of the interaction between the first length of the leg release button and the first conical cutout of the inner leg portion of the leg assembly;

FIG. 10C illustrates a cross-sectional side view of the inner leg portion clearing a second length of the leg release button when the leg release button is depressed;

FIG. 10D illustrates an overhead view of the inner leg portion clearing a second length of the leg release button when the leg release button is depressed;

FIG. 11A illustrates an isometric view of the interaction between a third length of the leg release button and the second conical cutout of the inner leg portion of the leg assembly;

FIG. 11B illustrates an overhead view of the interaction between the third length of the leg release button and the second conical cutout of the inner leg portion of the leg assembly;

FIG. 11C illustrates a cross-sectional side view of the interaction between the third length of the leg release button and the second conical cutout of the inner leg portion of the leg assembly;

FIG. 11D illustrates an overhead view of the clearance of the curved edge relative to the third length of the leg release button when the leg release button is depressed or when the second conical cutout of the leg assembly backdrives the third length and thereby depresses the leg release button;

FIG. 11E illustrates a cross-sectional side view of the curved edge clearing the second length of the leg release button when the leg release button is depressed or when the second conical cutout of the leg assembly backdrives the third length and thereby depresses the leg release button;

FIG. 11F illustrates a cross-sectional side view of the curved edge clearing the second length of the leg release button when the leg release button is depressed or when the second conical cutout of the leg assembly backdrives the third length and thereby depresses the leg release button;

FIG. 13 illustrates how depression of a leg extension locking component can allow extension of a leg assembly;

Figure 15:
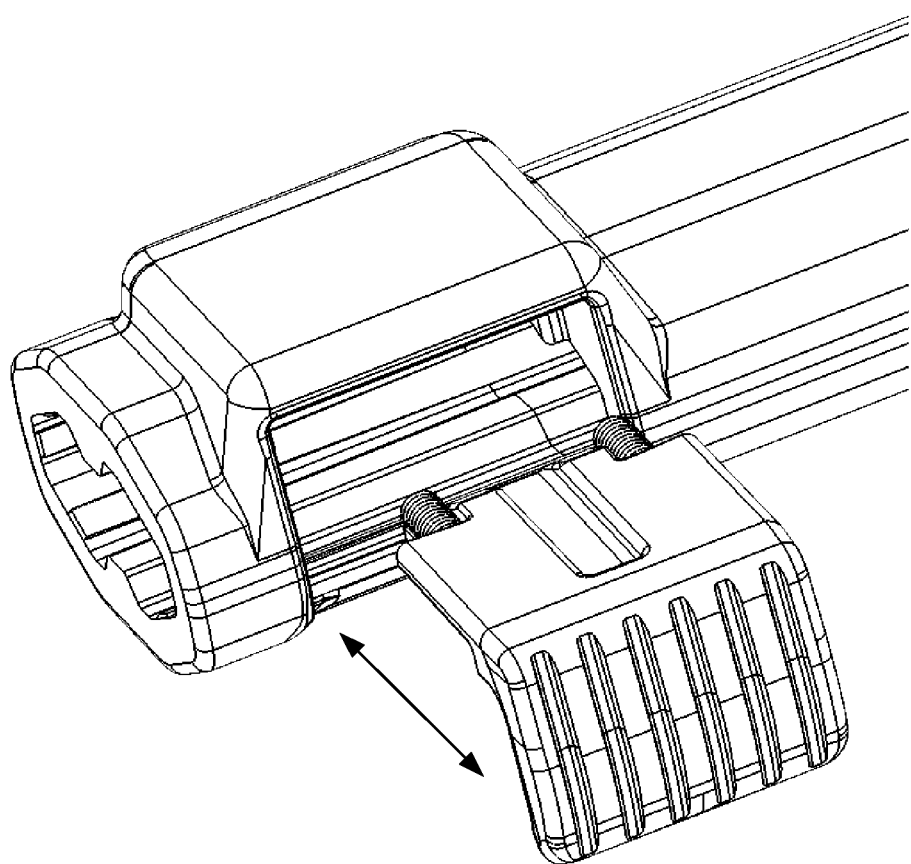
Figure 16:
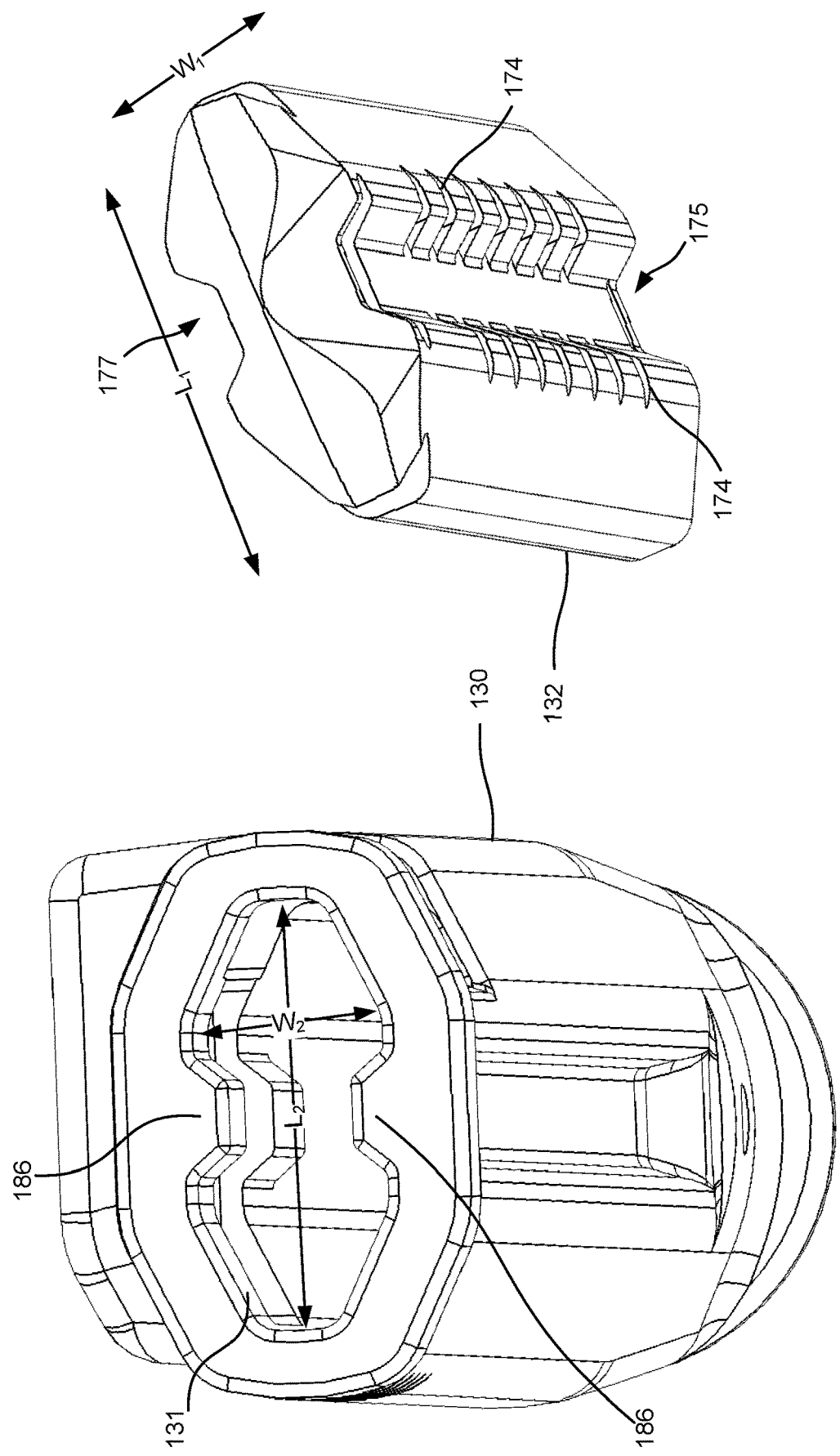
Figure 17:
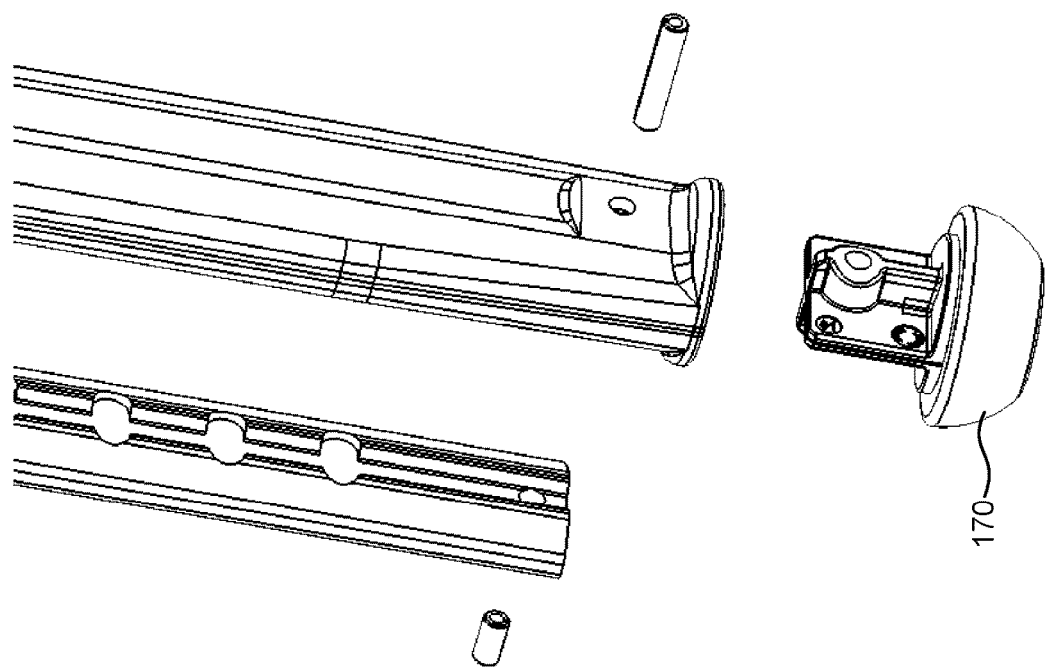
Figure 18:
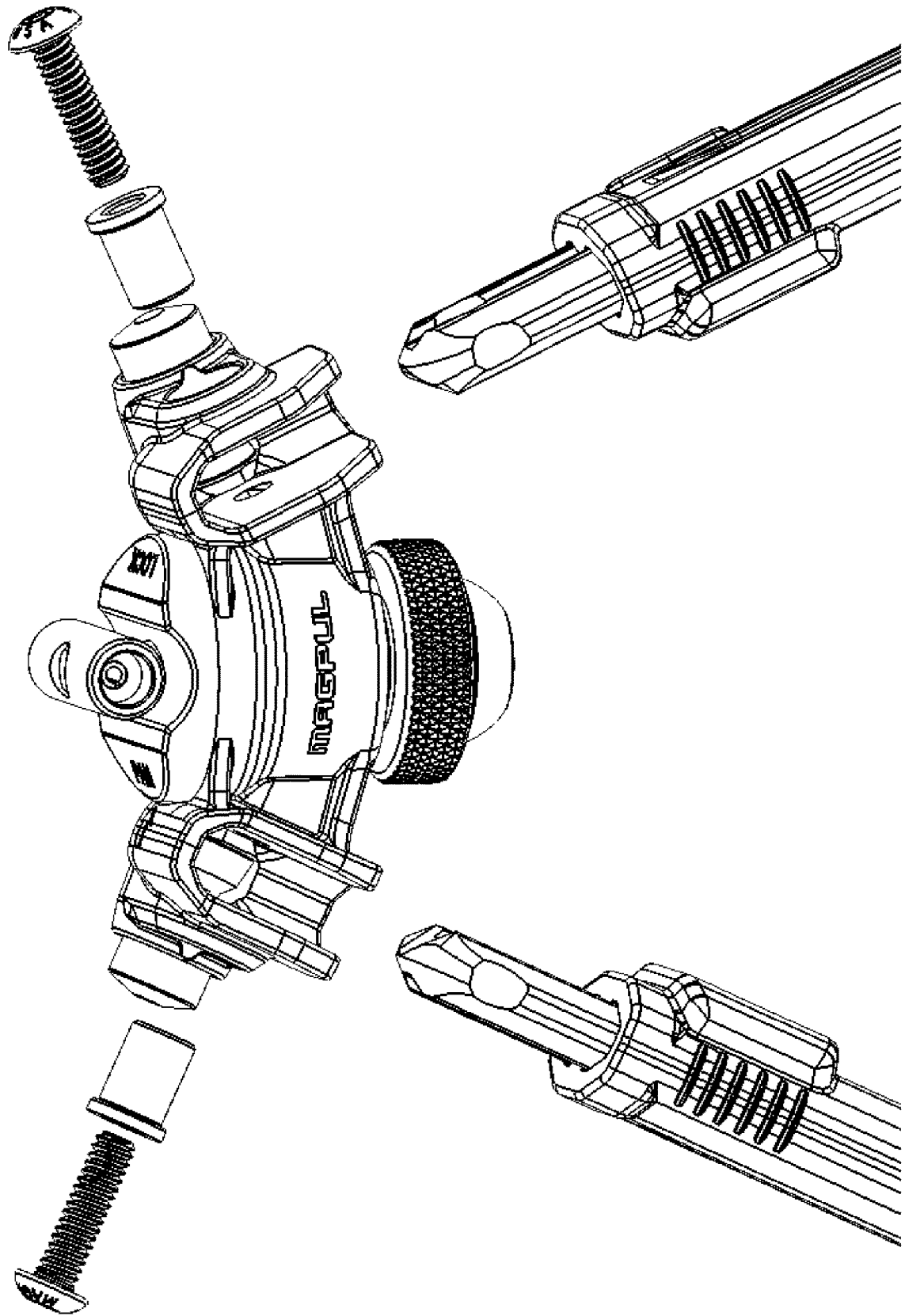
Figure 19:
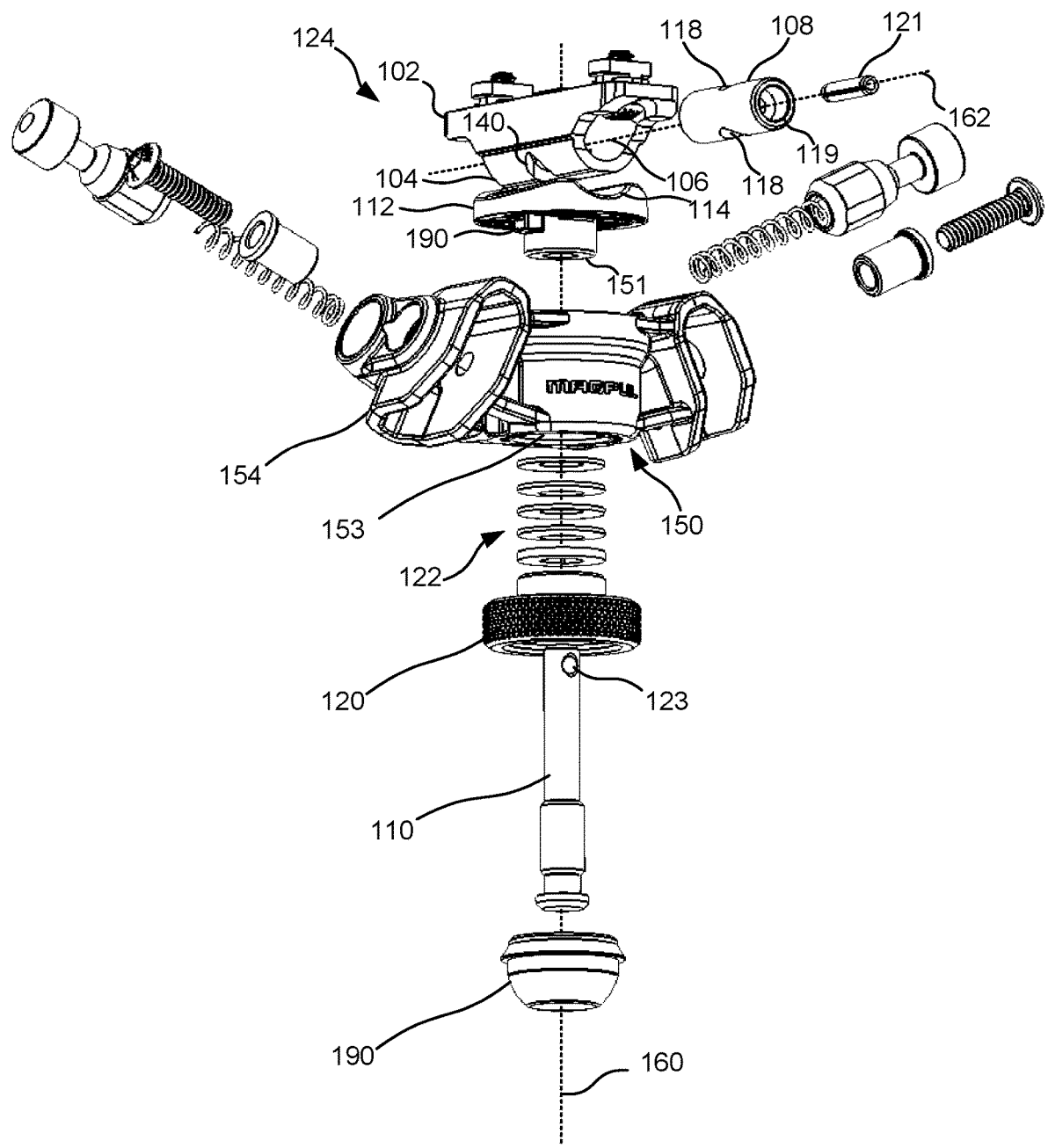
Figure 20:
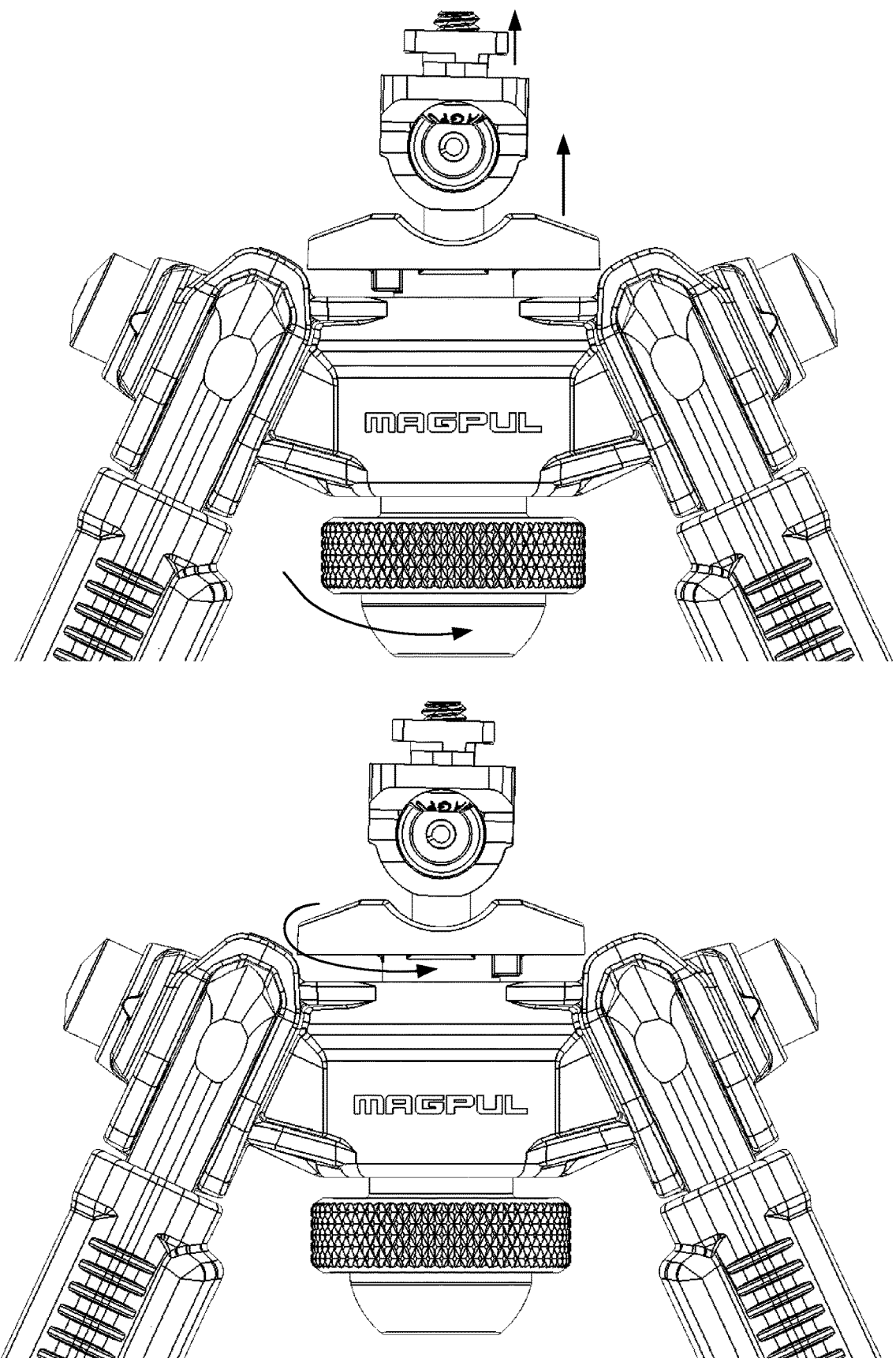
Figure 21:
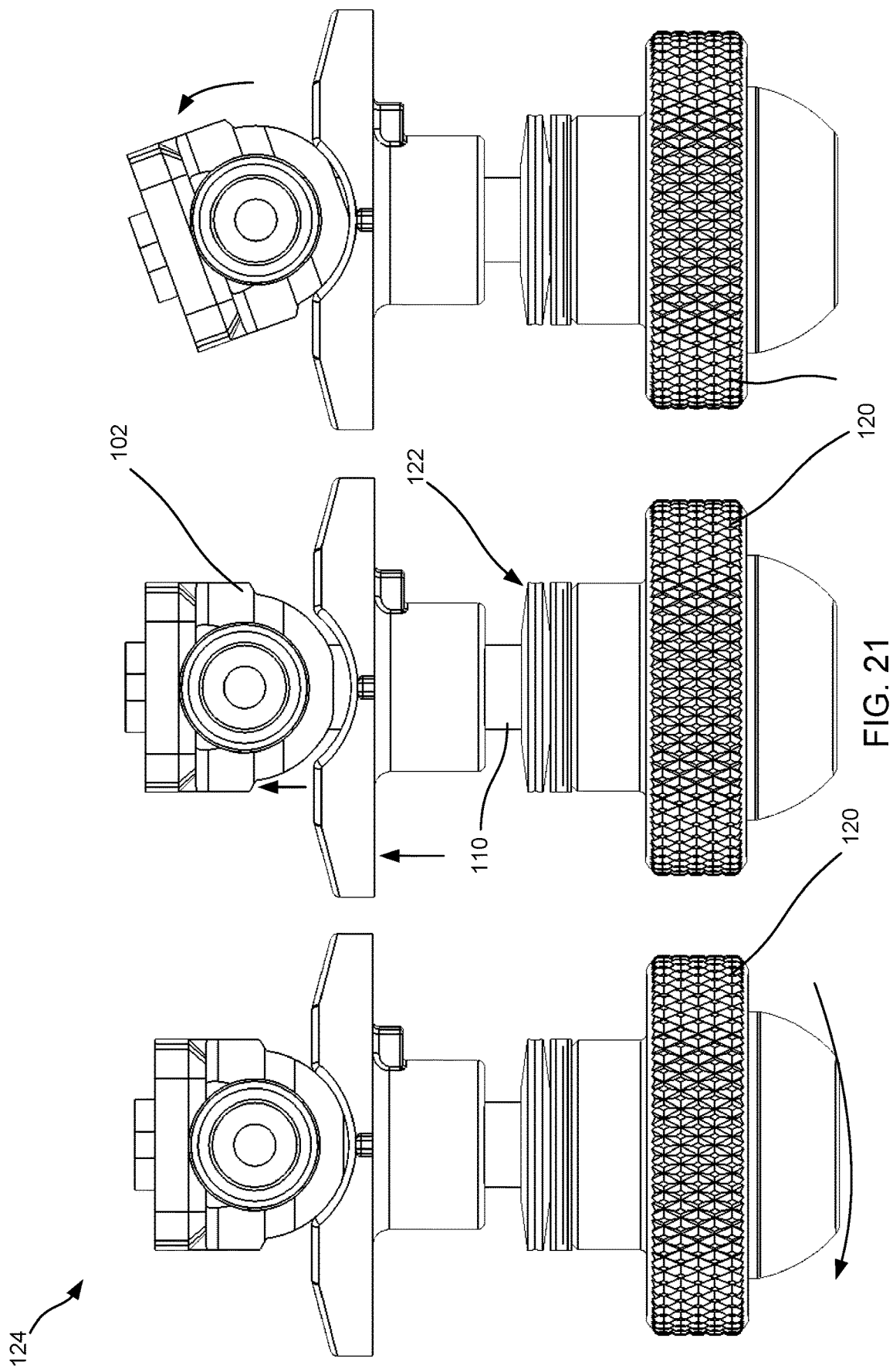
Figure 22:
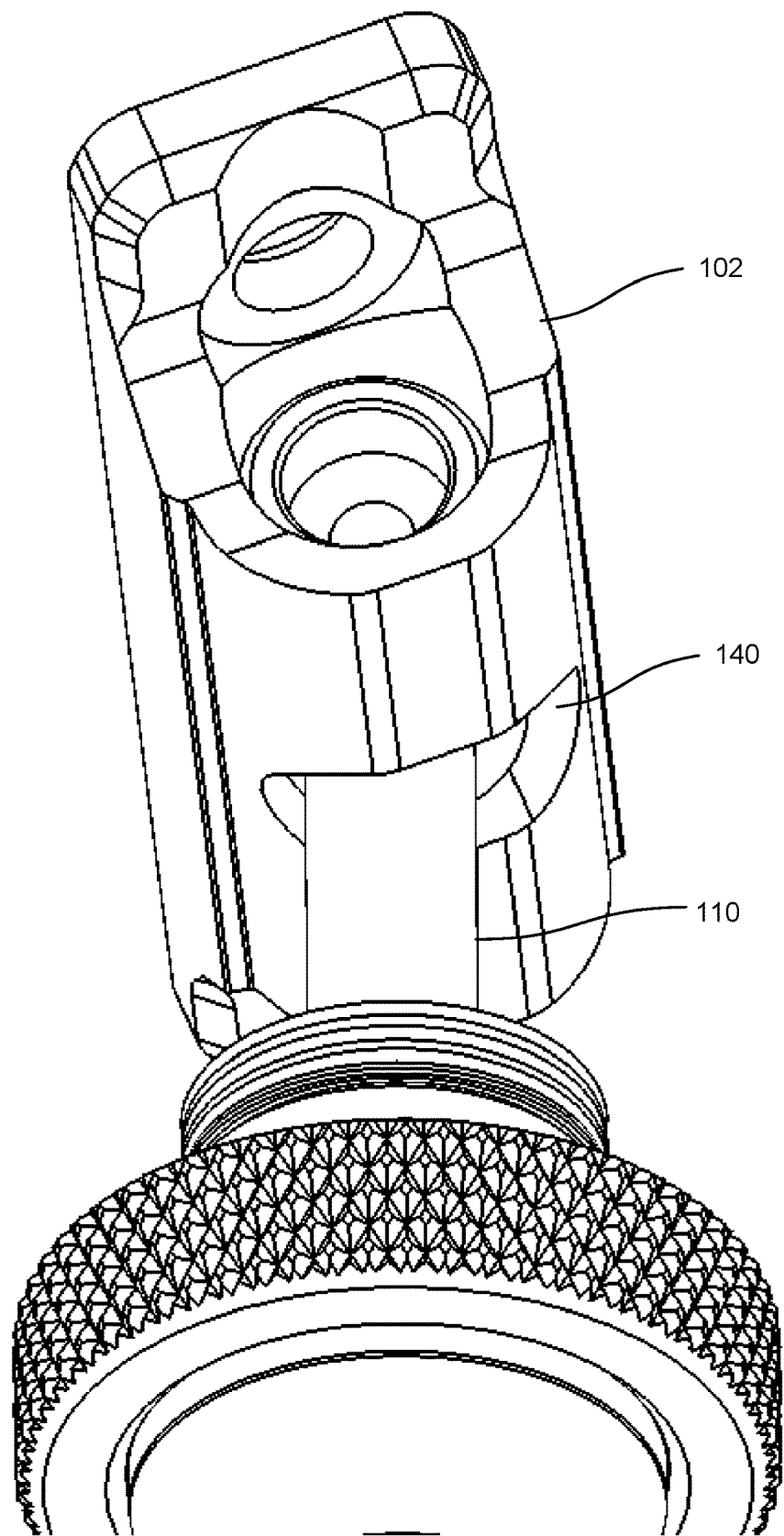
Figure 23:
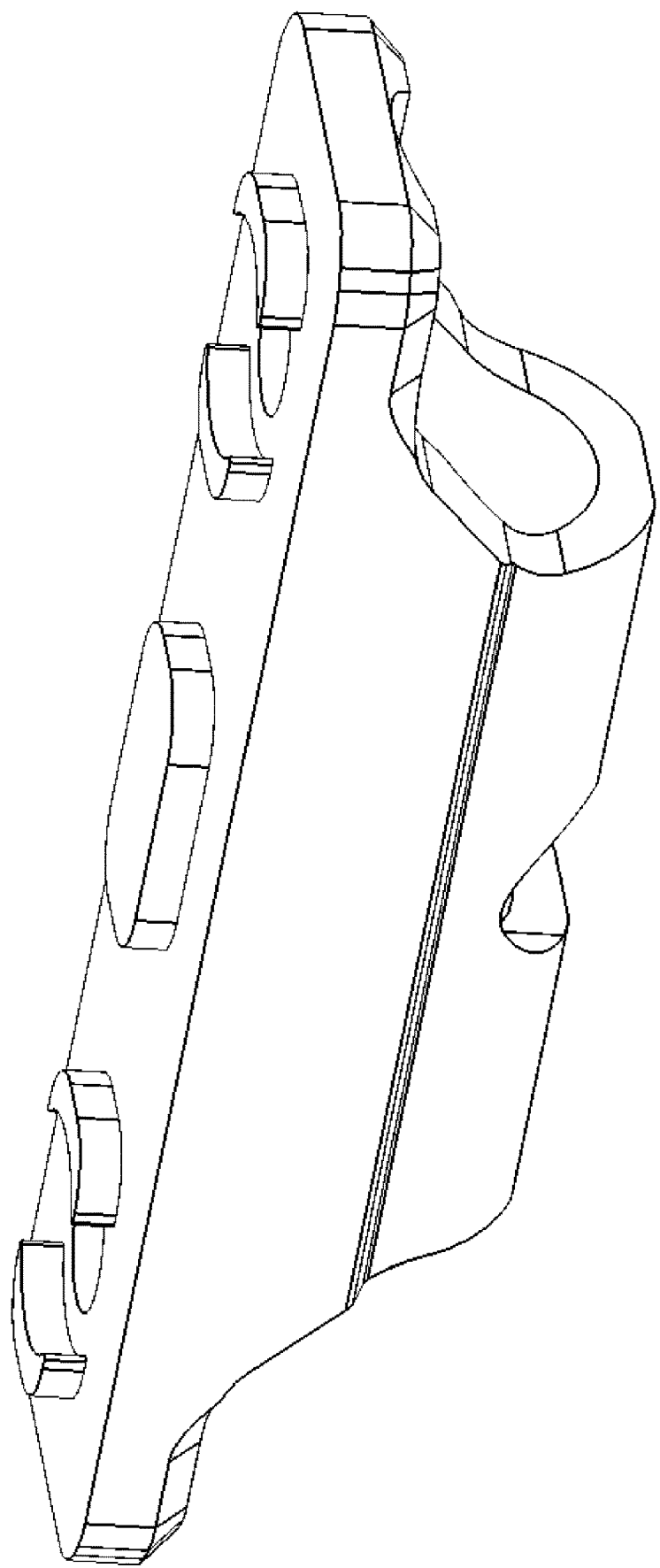
Figure 27A:
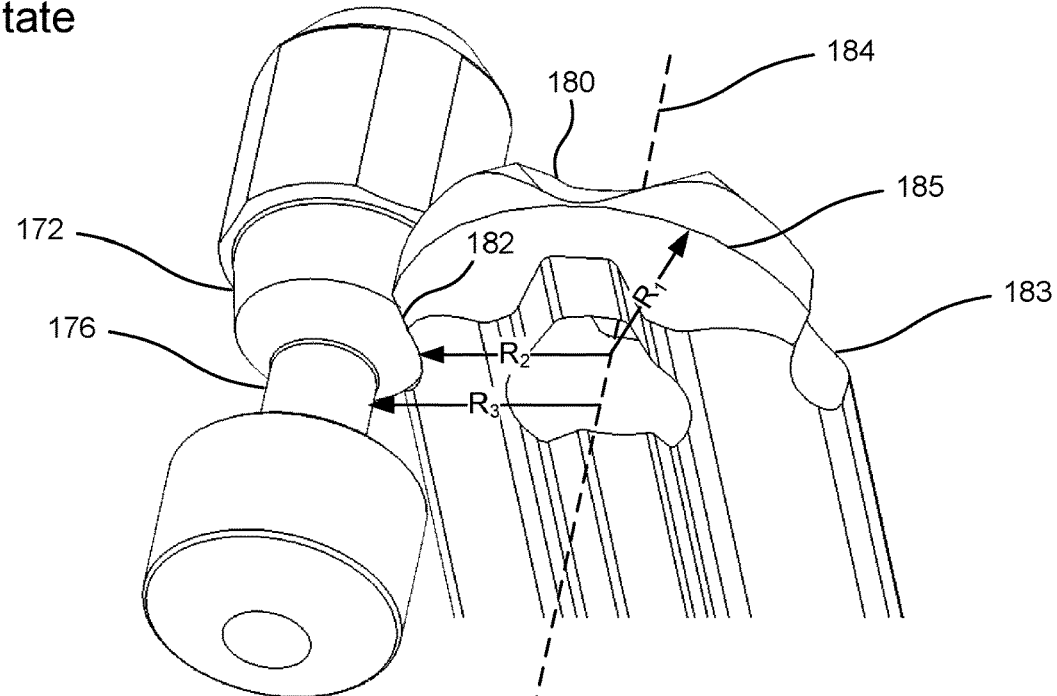
Figure 27B:
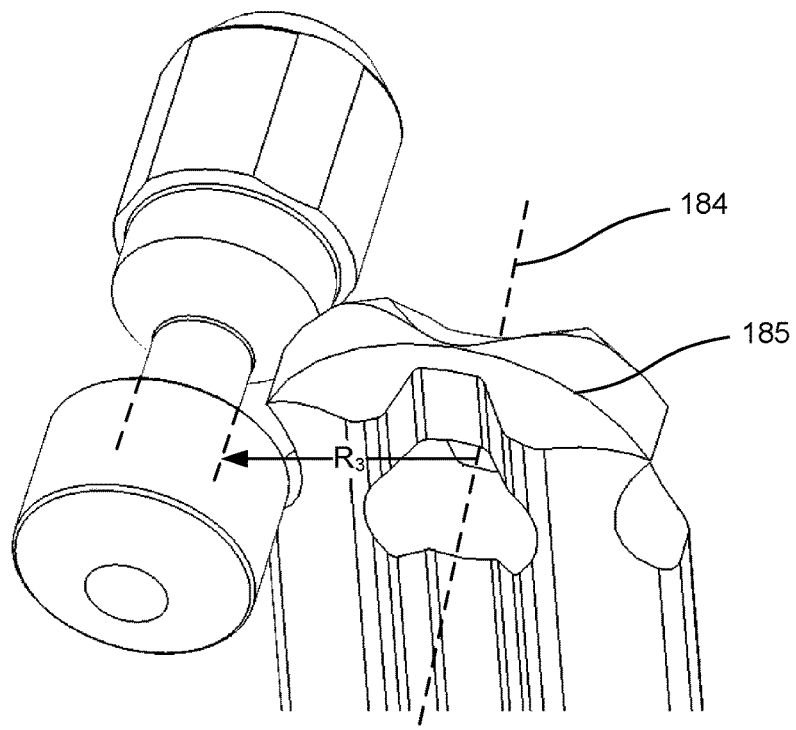
Figure 28:
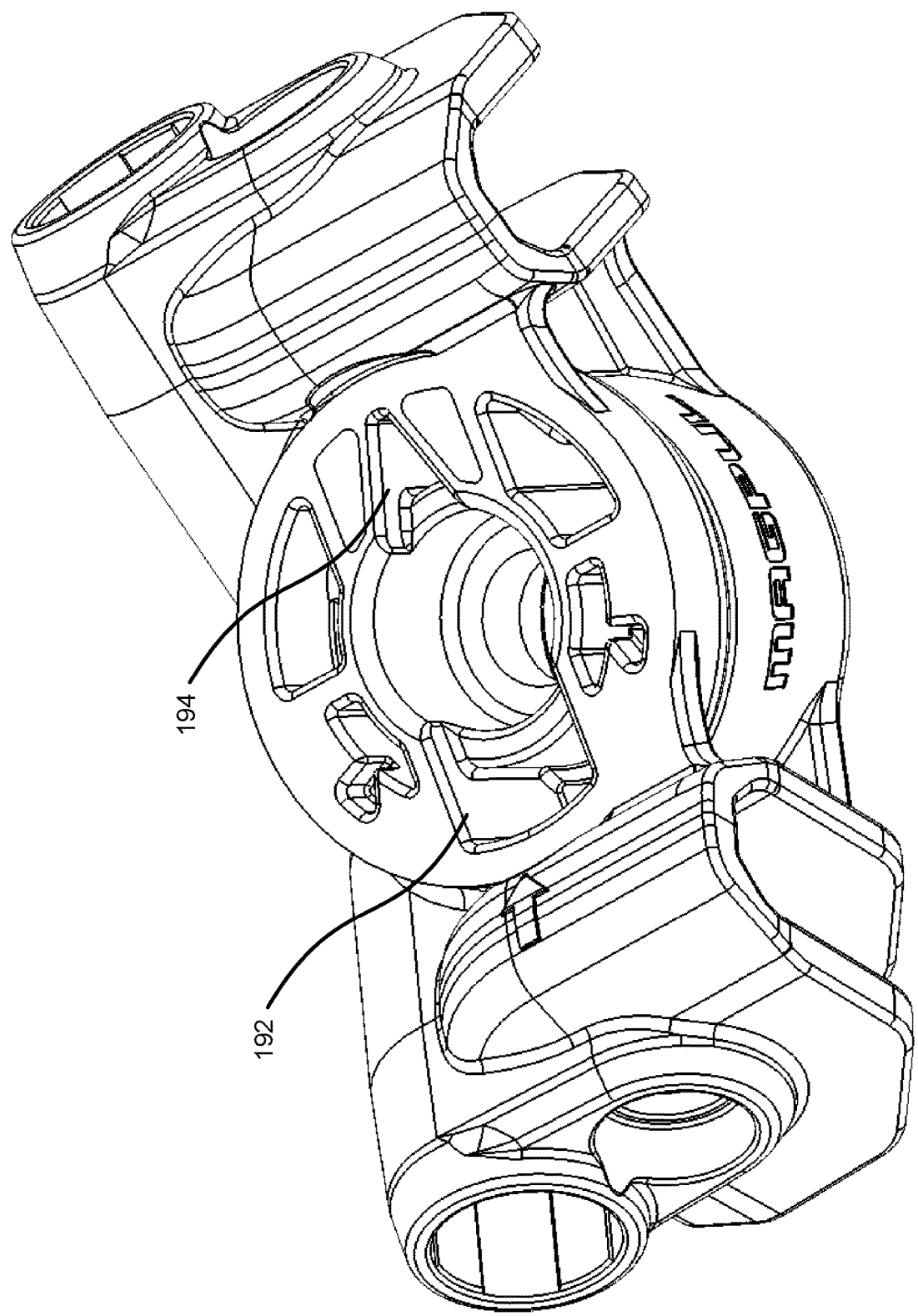
Figure 29:
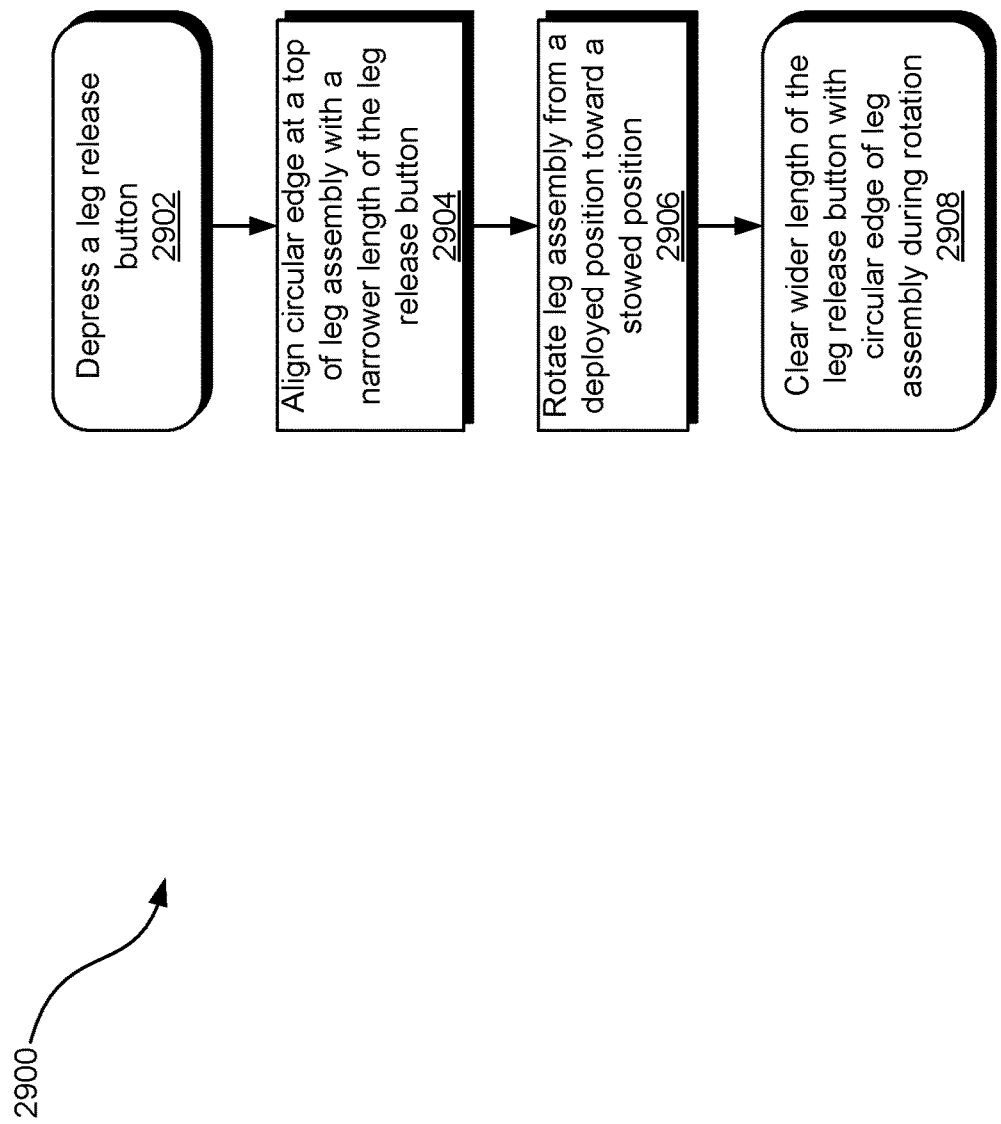
Figure 30:
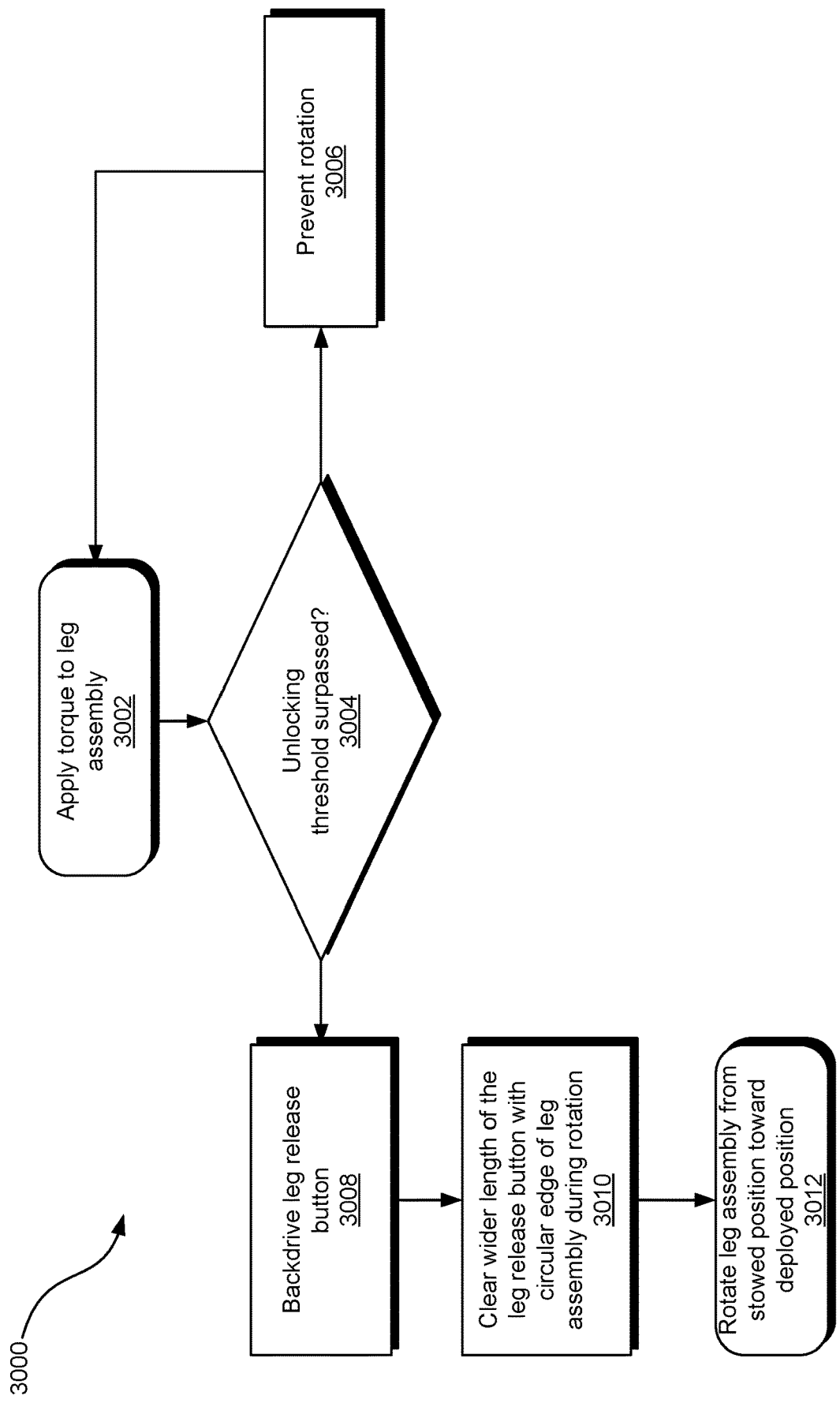
Figure 31:
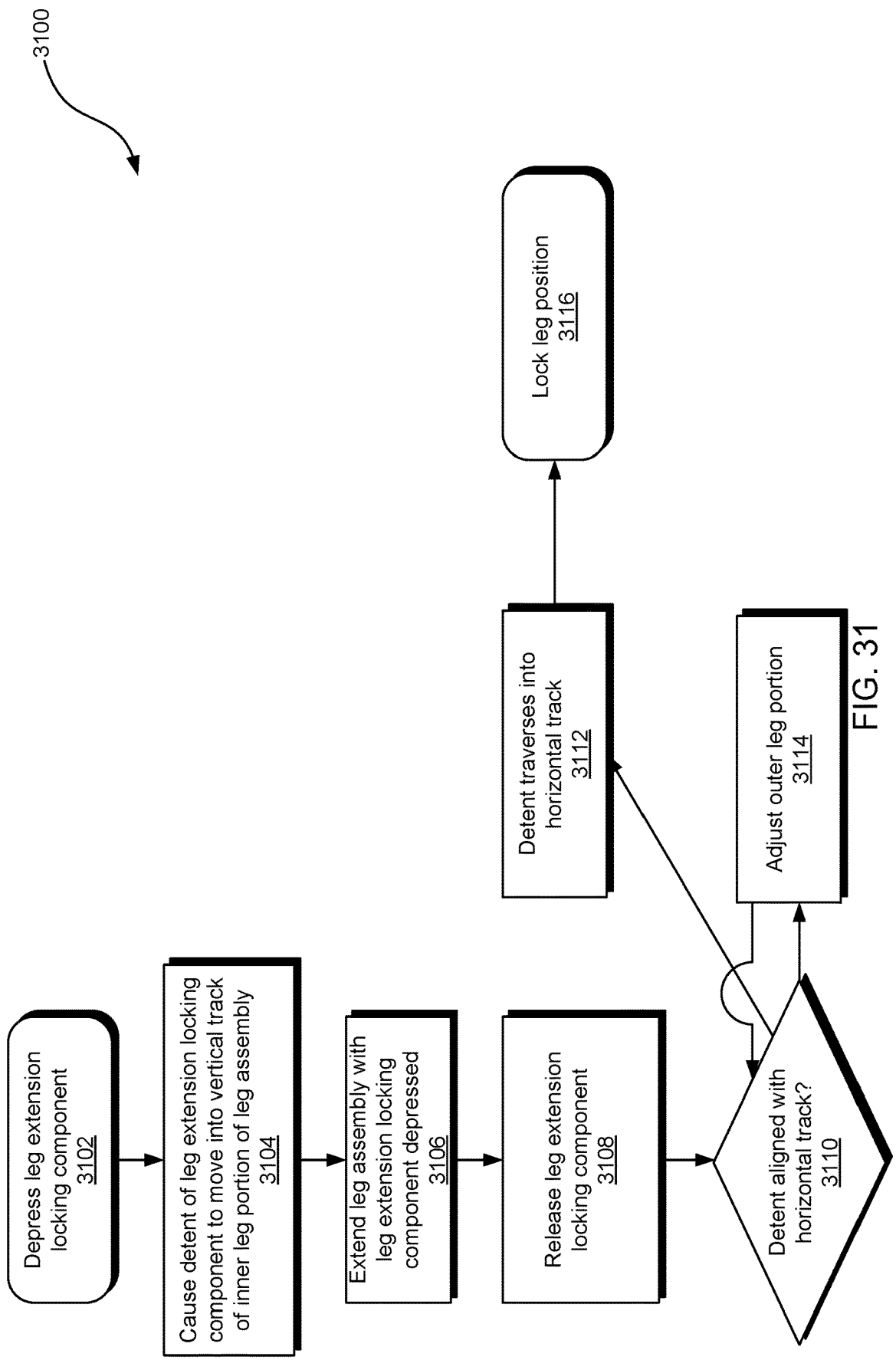
Figure 32:
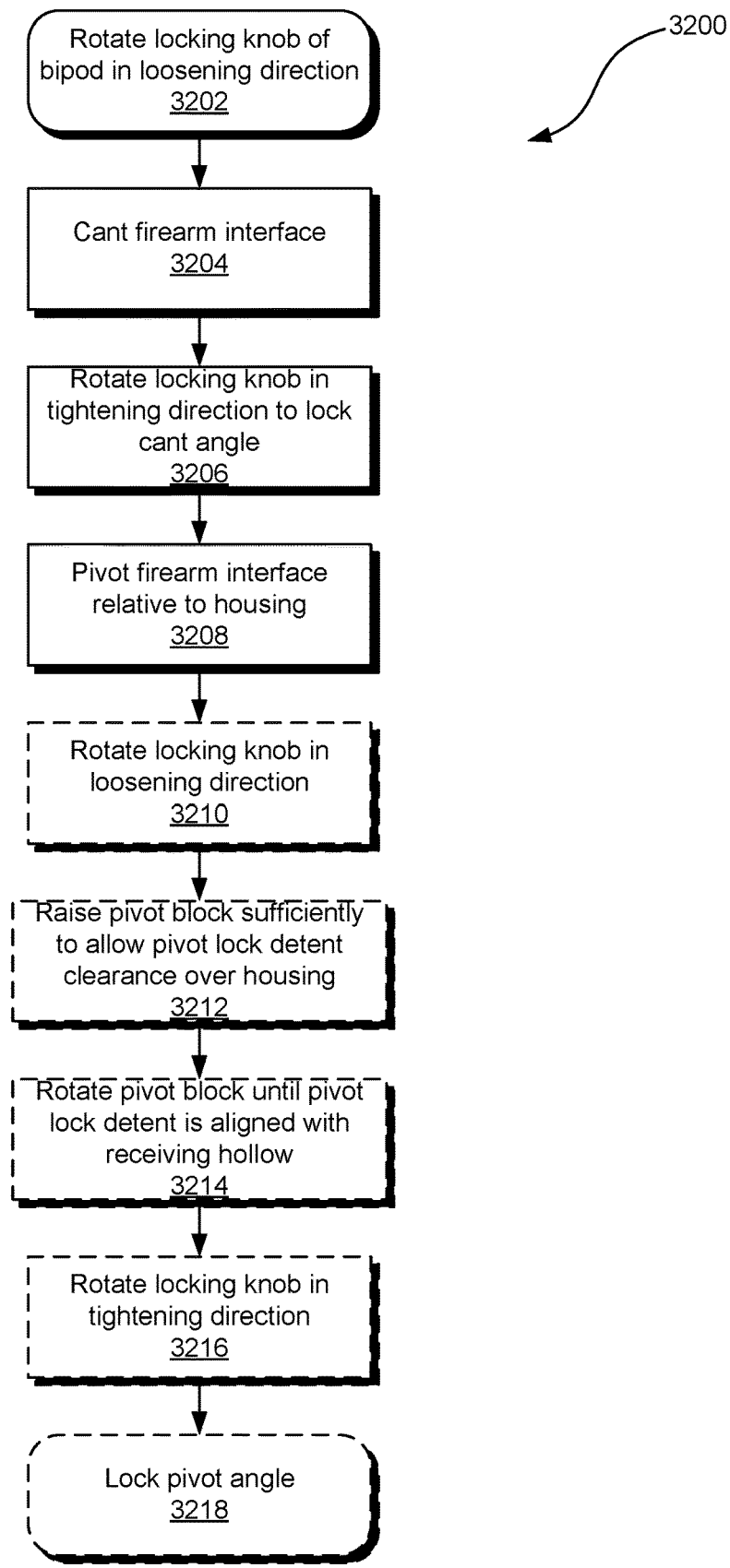

14B illustrates a further close-up view of the inner side of the leg extension locking component;

FIG. 15 illustrates an embodiment of movement of the leg extension locking component relative to the outer leg portion of the leg assembly;

FIG. 16 illustrates views of the outer leg portion (left) and the inner leg portion (right) of the leg assembly;

FIG. 17 illustrates a close-up view of the foot of the leg assembly;

FIG. 18 illustrates a partially exploded view of the bipod with the firearm interface hidden;

FIG. 19 illustrates a close-up exploded view of the bipod with the leg assemblies hidden;

FIG. 20 illustrates an embodiment of the pivot lock functionality;

FIG. 21 illustrates an embodiment of releasing the firearm interface for canting thereof;

FIG. 22 illustrates a view of an underside of the firearm interface to show that the locking rod can pass through ovular aperture of the firearm interface at a variety of cant angles;

FIG. 23 illustrates an embodiment of a firearm interface shaped for use with M-LOK;

FIG. 24 illustrates an embodiment of the firearm interface shaped for use with a rail such as a Picatinny or NATO rail;

FIG. 25 illustrates further views of the firearm interface of FIG. 24;

FIG. 26 illustrates an embodiment of the firearm interface shaped for use with a sling stud;

FIG. 27A illustrates a close-up view of the leg release button in the locked state and its interaction with the inner leg portion of the leg assembly;

FIG. 27B illustrates a close-up view of the leg release button in the unlocked state and how the curved edge 185 is able to clear the second length of the leg release button in this unlocked state;

FIG. 28 illustrates an isometric view of the housing in isolation;

FIG. 29 illustrates a method of stowing deployed legs of a bipod according to an embodiment of this disclosure;

FIG. 30 illustrates a method of deploying stowed legs of a bipod according to an embodiment of this disclosure;

FIG. 31 illustrates a method of extending or collapsing legs of a bipod according to an embodiment of this disclosure; and FIG. 32 illustrates a method of pivoting and canting a firearm interface assembly according to an embodiment of this disclosure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Intro

The bipod can include a housing with two leg assemblies attached thereto. The housing can include an aperture through which passes a pivot rod, the pivot rod having a threaded coupling to a locking knob arranged below the housing, wherein turning of the locking knob results in the pivot rod moving up or down along a vertical axis passing through the pivot rod and the housing. A top of the pivot rod can be coupled to a cant nut having a tubular shape and a longitudinal axis perpendicular to the vertical axis. A firearm interface can include an aperture having a similar shape to the cant nut, and the cant nut arranged within this aperture in the firearm interface. The firearm interface can rotate or cant around the cant nut to provide canting to a firearm mounted to the firearm interface. A pivot block can be arranged between the housing and the firearm interface and can pivot atop the housing. The pivot block can include a concave hollow into which a portion of a bottom of the firearm interface is shaped to rest in such that when the locking knob is tightened, the pivot block and firearm interface pivot in unison. Rotation of the locking knob pushes the cant nut and thereby the firearm interface up or down to lock or unlock the firearm interface into the concave hollow in the pivot block. The firearm interface can be shaped to fit a variety of known and yet-to-be-known accessory interfaces, such as, but not limited to, M-LOK, Picatinny rail, and NATO rail.

Figure 1:
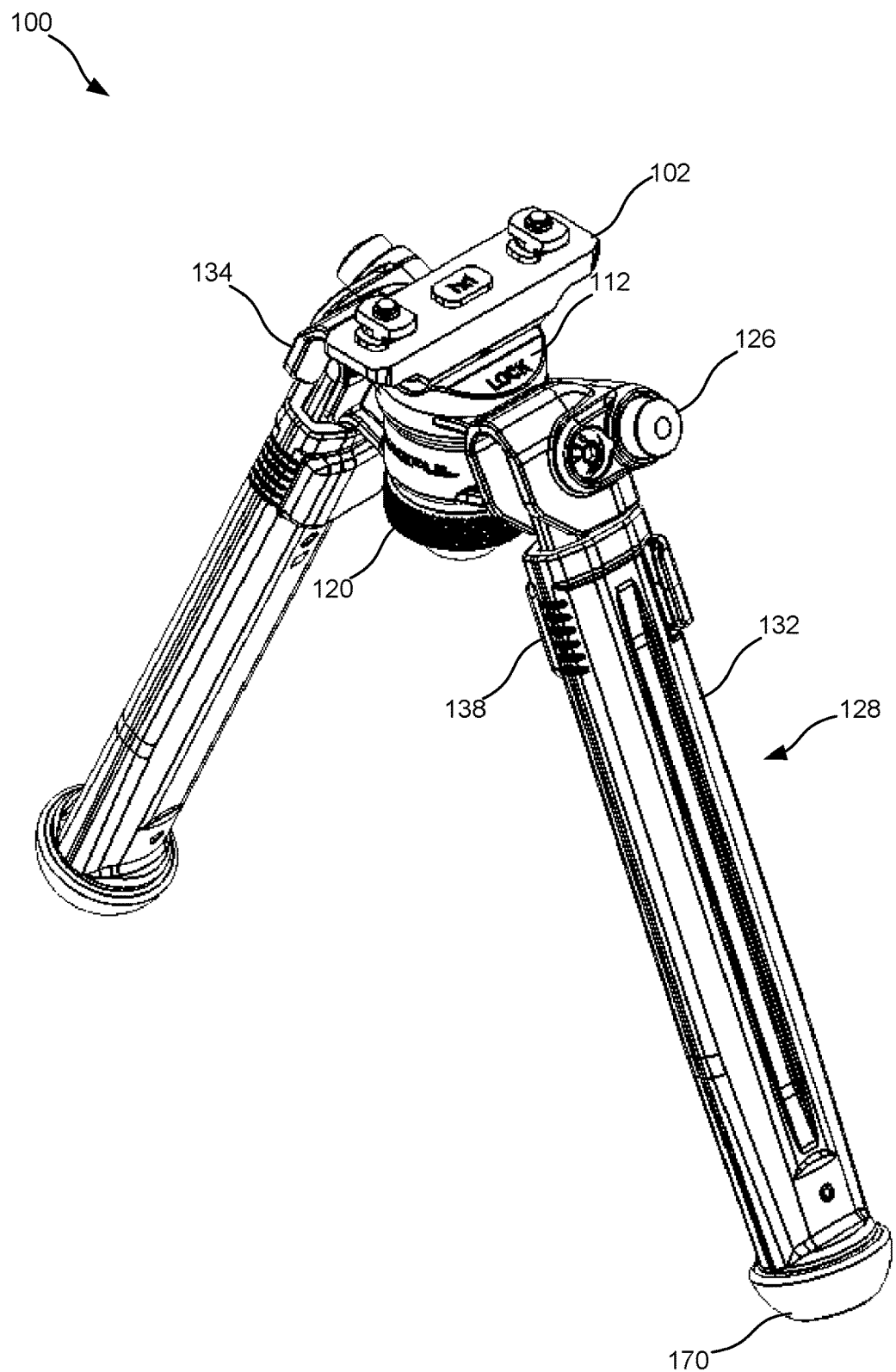
FIG. 1 illustrates one embodiment of a bipod configured to cant, pivot, rotate the legs into a stowed position, and telescope the legs.
Figure 2:
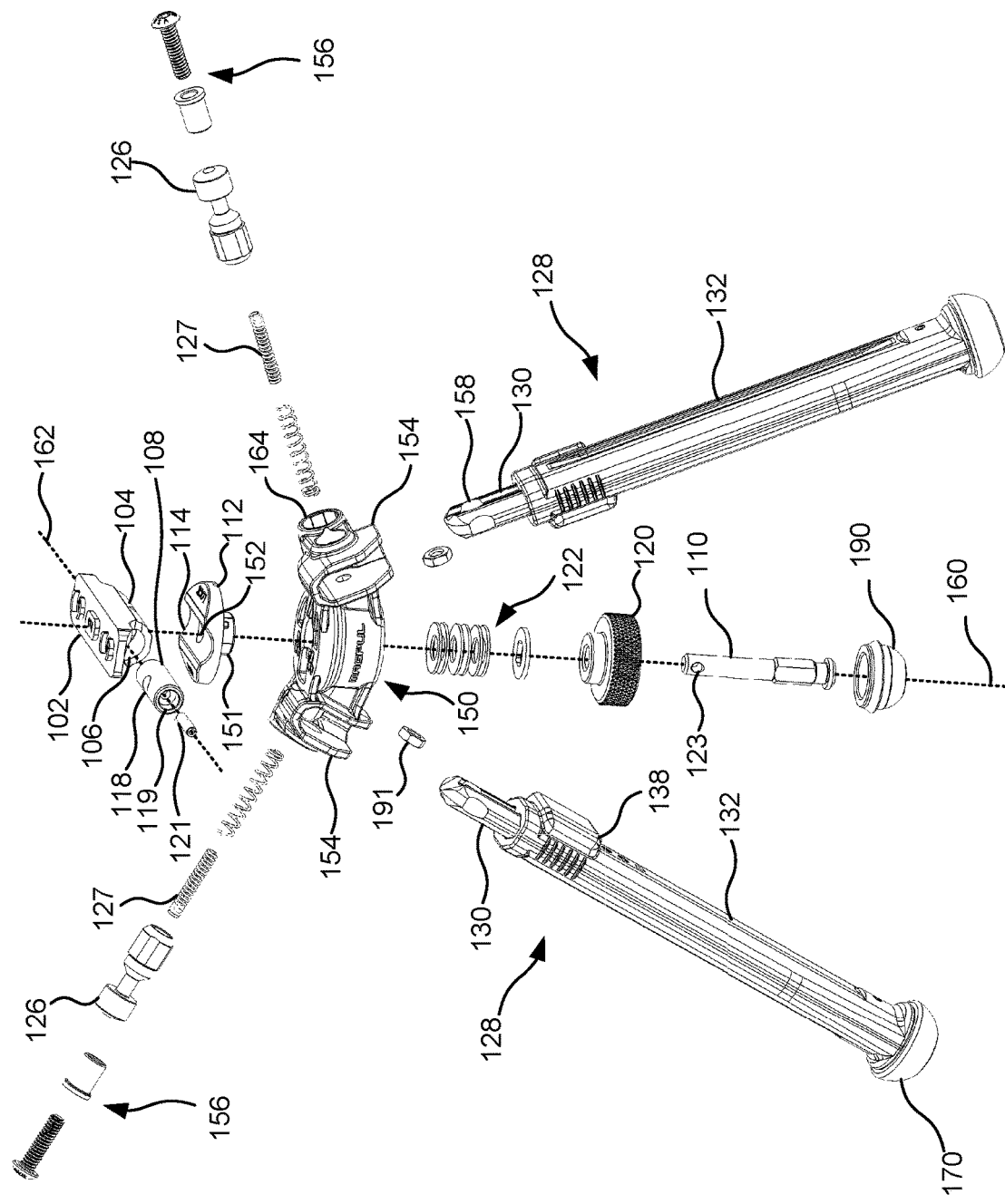
FIG. 2 illustrates an exploded view of FIG. 1.
Figure 3:
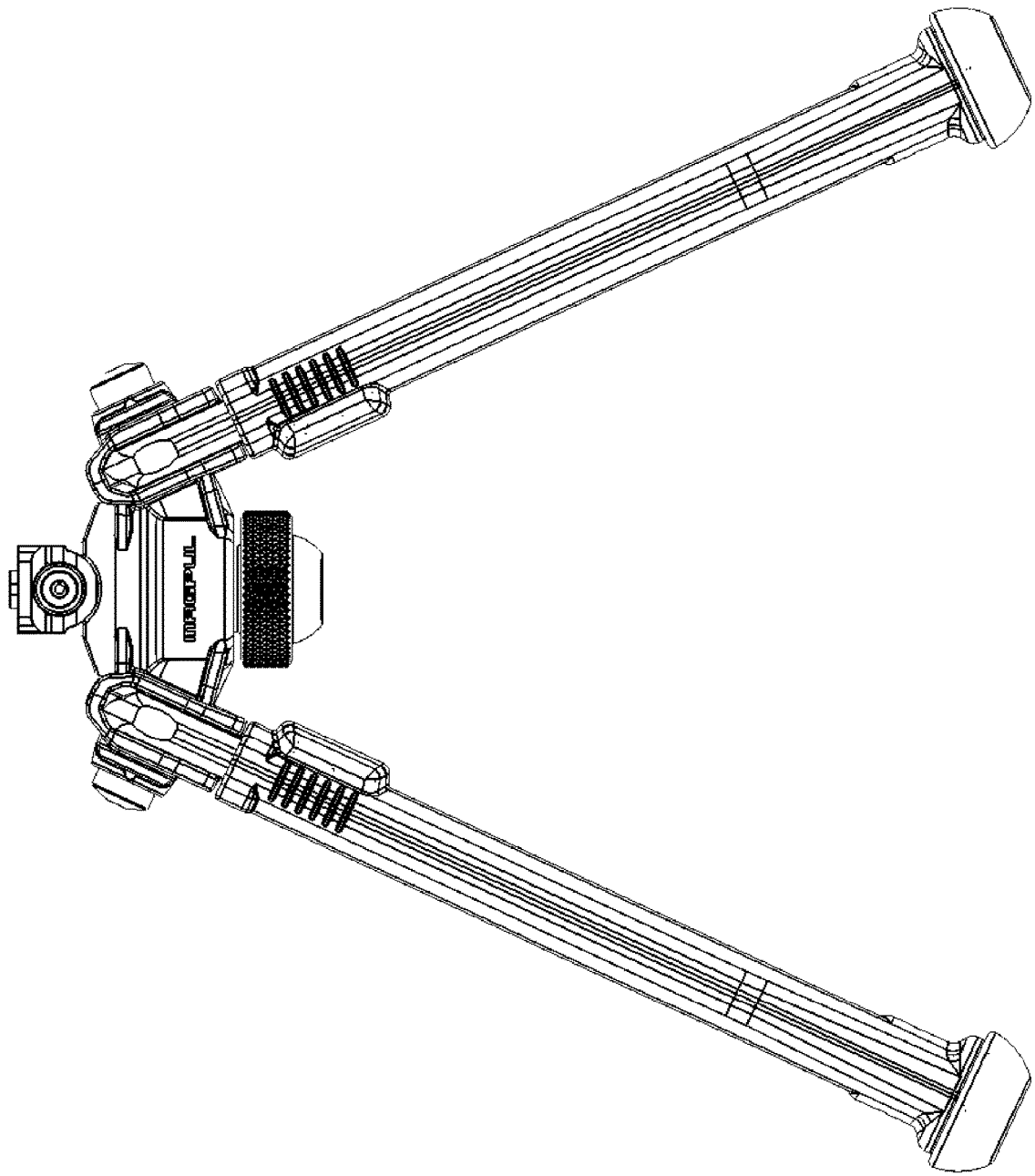
FIG. 3 illustrates a front view of the bipod of FIG. 1.
Figure 4:
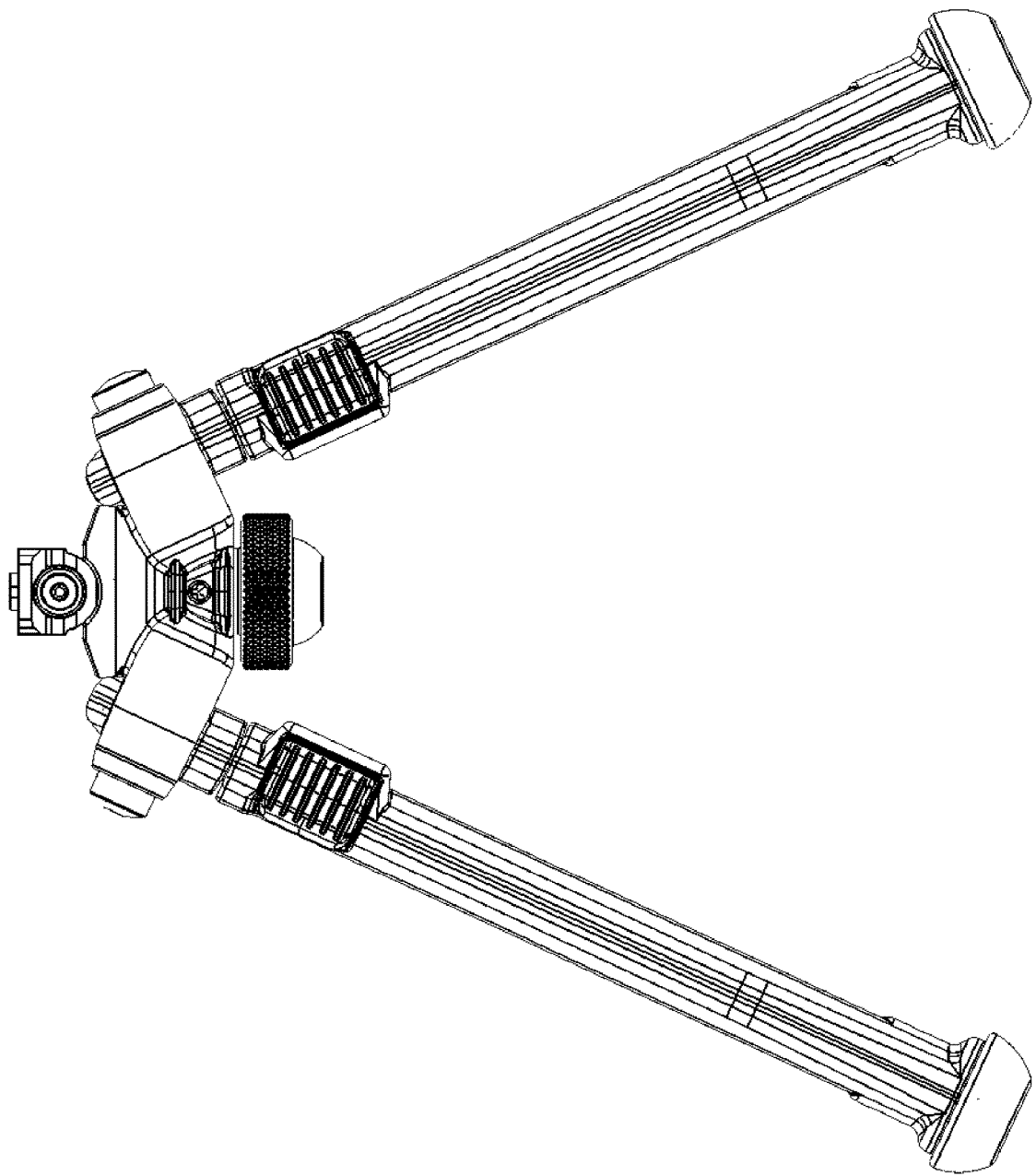
FIG. 4 illustrates a rear view of the bipod of FIG. 1.
Figure 6:
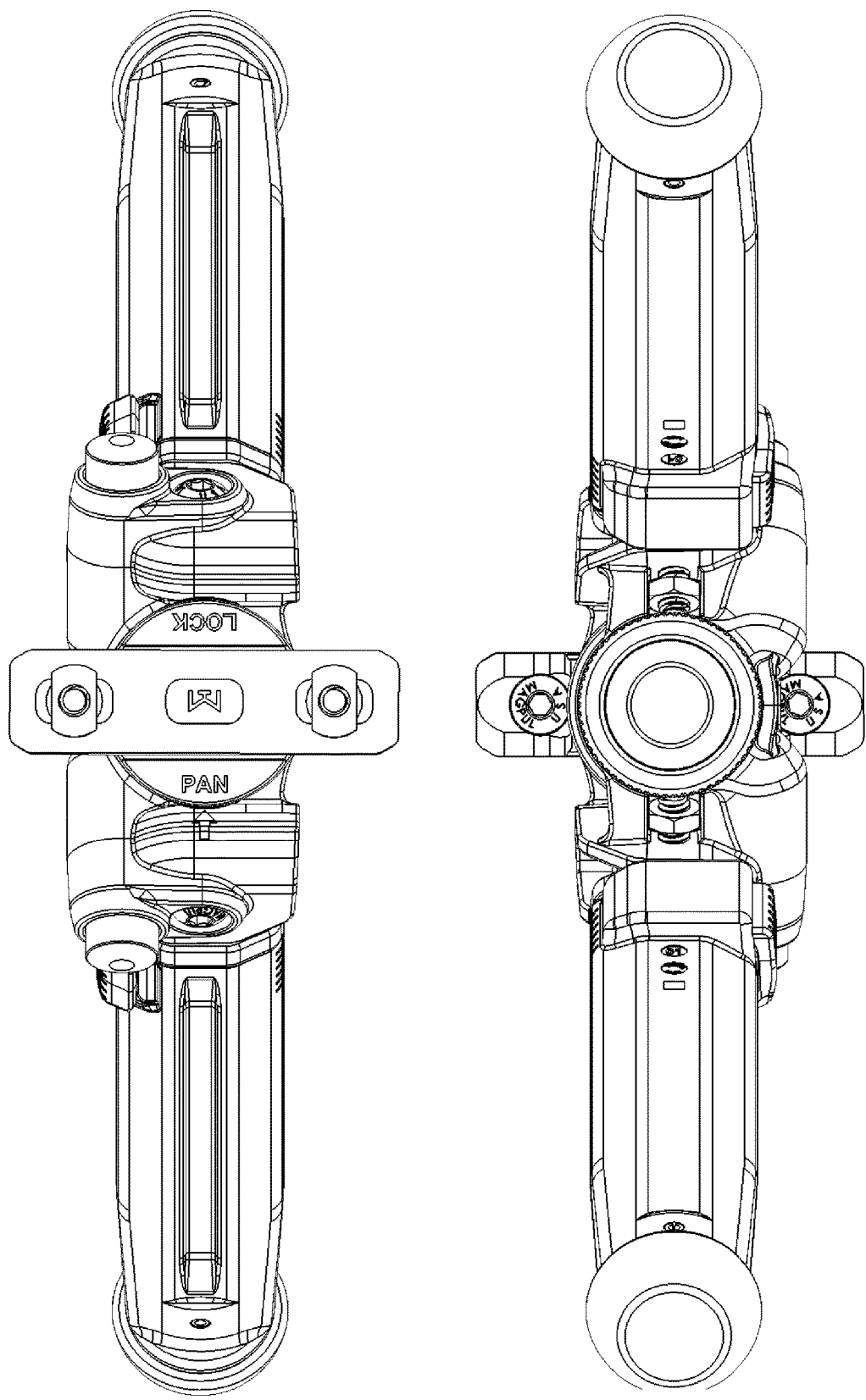
FIG. 6 illustrates top and bottom views of the bipod of FIG. 1.

FIG. 1 illustrates one embodiment of a bipod according to an embodiment of this disclosure while FIG. 2 illustrates an exploded view of the same. FIGS. 3-6 illustrate alternative views of this embodiment of the bipod 100. The bipod 100 enables selective and lockable cant and pivoting and interfacing with a firearm, such as a rifle, via one of various known interfacing platforms (e.g., M-LOK, NATO Rail, Picatinny). The legs can also telescope and be stored in a position roughly 90 rotated from a deployed position (i.e., folded up to a position near the forend of the firearm. The bipod 100 can include a firearm interface 102, which in this embodiment is configured for interfacing with a firearm, handguard of a firearm, etc. via the M-LOK platform. While many of the figures in this disclosure show an M-LOK interface, these are not intended to be limiting, and FIGS. 23-25 show examples of Picatinny and NATO Rail interfaces, respectively, to provide two other non-limiting examples. The firearm interface 102 is also partially responsible for canting of the firearm, and thus can have a tubular or curved bottom 104 and a tubular aperture 106 extending along, and concentric with, a horizontal axis 162 of the firearm interface 102. A cant nut 108 can be arranged within the tubular aperture 106 and can have a rotational coupling to the firearm interface 102 thereby enabling the firearm interface 102 to cant around the cant nut 108. The tubular aperture 106 can be flush with or nearly flush with the cant nut 108. The cant nut 108 has a vertical tubular aperture 118 that accepts a pivot rod 110, this vertical tubular aperture 118 being arranged along and concentric with a vertical axis 160. The horizontal and vertical axes 160, 162 can be perpendicular to each other regardless of a rotational position of the firearm interface 102. Thus, the vertical tubular aperture 118 can be perpendicular to a longitudinal axis of the firearm interface 102 as well as a longitudinal axis of the cant nut 108. The vertical tubular aperture 118 surrounds an upper portion of the pivot rod 110. The cant nut 108 can include a longitudinal aperture 119 shaped to accept a locking pin 121. The locking pin 121 can pass through the longitudinal aperture 119 and through a locking pin aperture 123 in the upper end of the pivot rod 110 thereby creating a fixed relationship between the cant nut 108 and the pivot rod 110. As such, the cant nut 108 and the pivot rod 110 can both pivot around the vertical axis 160 and move vertically along the vertical axis 160 in unison. The horizontal axis 162 can pivot with the cant nut 108 and the firearm interface 102 so that the longitudinal axes of these two components are always aligned with the horizontal axis 162.

For the purposes of this disclosure, "pivot" or "pivoting" refers to rotation about the vertical axis 160 and "cant" or "canting" refers to rotation around the horizontal axis 162.

The curved bottom 104 of the firearm interface 102 is shaped to fit partially into and rotationally interface with a concave hollow 114 in a pivot block 112. The pivot block 112 can rest on and partially within a housing 150. The housing 150 can include a vertical housing aperture 153 concentrically arranged around the pivot rod 110 and accepting a tubular detent 151 extending from a bottom of the pivot block 112. The pivot block 112 can also include a vertical pivot block aperture 152 that is concentric with the tubular detent 151 and the vertical axis 160 and allows the pivot rod 110 to pass through and rotate within the pivot block 112.

Figure 9:
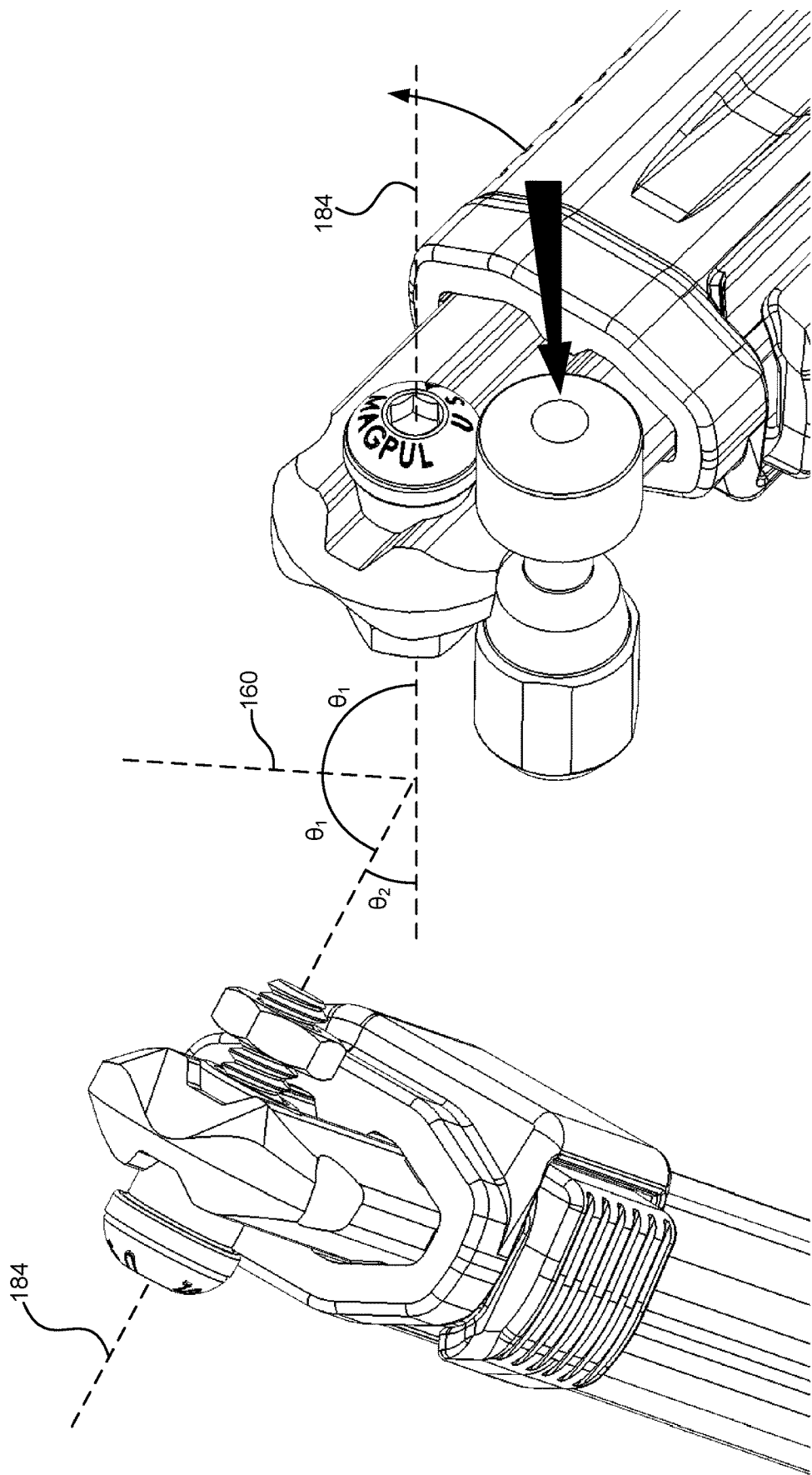
FIG. 9 illustrates a close-up isometric view of the leg assemblies, their leg deployment pivot axes, and the interplay between a conical cutout on one of the leg assemblies and a corresponding leg release button.

The housing 150 can have a generally cylindrical shape with two leg housings 154 on each side of the housing 150, each disposed at an angle, $\theta_1$, relative to the vertical axis 160 (see e.g., FIG. 9). The leg assemblies 128 can be arranged at an angle, $\theta_2$, relative to each other. The leg housings 154 can be closed on four sides (e.g., top, sides, and rear) and open on two sides (e.g., front and bottom), and can each accept an upper portion of a leg assembly 128. Each leg assembly 128 can include an inner leg portion 130 and an outer leg portion 132. The inner leg portion 130 can have a profile that fits within a hollow interior 131 of the corresponding outer leg portion 132 (e.g., see FIG. 16) such that the outer leg portion 132 can slide along the inner leg portion 130 while always partially surrounding the inner leg portion 130 (e.g., see FIG. 13). Each leg assembly 128 further includes a leg extension locking component 138 (e.g., see FIGS. 1, 2, and 13-15). The leg extension locking component 138 can be depressed and slide perpendicular to a longitudinal axis of the corresponding leg assembly 128 to release the leg assembly 128 for telescoping of the leg assembly 128.

The leg assemblies 128 can have a rotational coupling to the leg housings 154 via fastening means 156 (e.g., a screw passing through a bushing, the bushing arranged in an aperture in an outside of the leg housing 154, the screw passing through an opposing side of the leg housing 154 and threading into a washer 191 inside the housing 150). A snap pin fastener or other means could also be used to couple the leg assemblies 128 to the leg housings 154. The fastening means 156 can pass through a rotation aperture 158 near a top of each inner leg portion 130 (e.g., see FIG. 8). Both the fastening means 156 and the rotation aperture 158 can be aligned with and concentric around a leg deployment pivot axis 184 of the leg assembly 128 (e.g., see FIG. 27).

Figure 7:
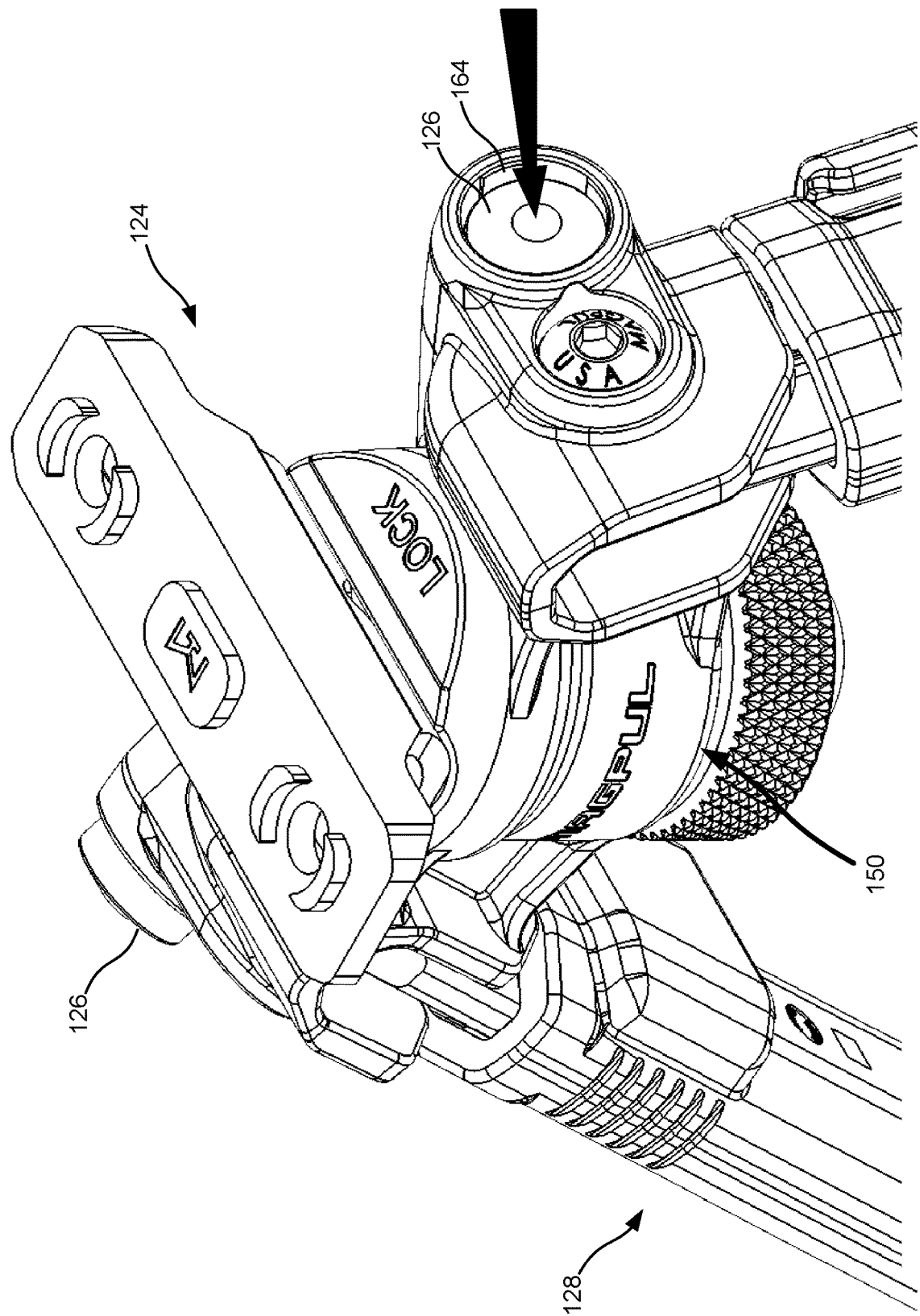
FIG. 7 illustrates an isometric close-up view of the bipod, with one of two leg release buttons depressed.
Figure 12:
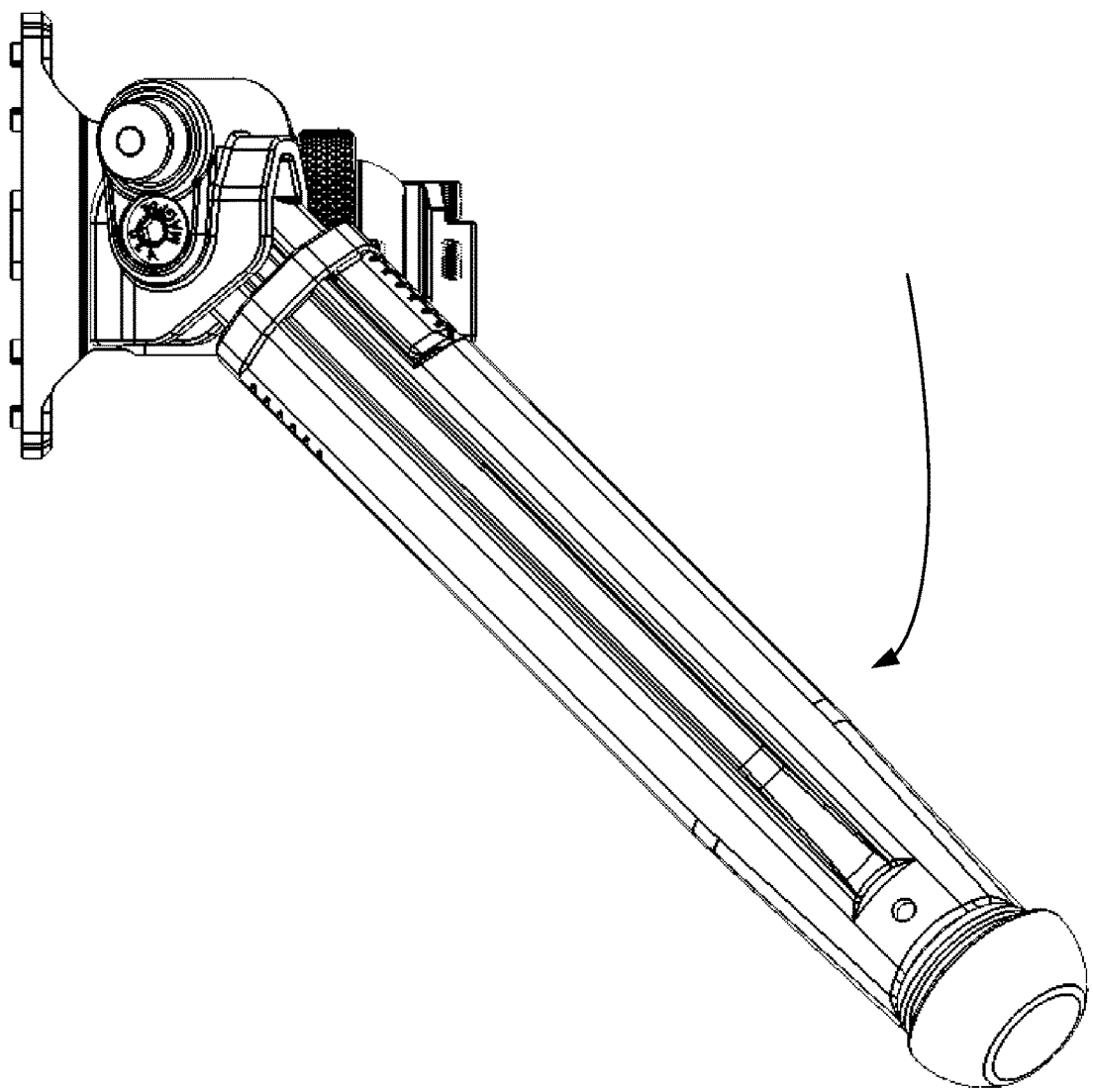
FIG. 12 illustrates a side view of the bipod with one of the leg assemblies rotating from the deployed position toward a stowed position.

A leg release button 126 for each leg assembly 128 can have a sliding arrangement within a leg locking aperture 164 in each side of the housing 150. FIG. 7 shows a first leg release button 126 on a right of the page being depressed, whereas a second leg release button 126 on a left of the page is not depressed. The leg release button 126 can be biased from a center of the housing 150 toward an exterior of the leg locking apertures 164. Such biasing may be provided by a spring or other button biasing mechanism 127 (see FIG. 2). In a locked state, the leg release buttons 126 may rest at or proud of the leg locking apertures 164. When depressed the leg release buttons 126 may be pushed into the leg locking apertures 164 (i.e., toward the housing 150). In the locked state, the leg release buttons 126 act as a leg rotation lock and prevent the leg assemblies 128 from rotating. In other words, a torque applied to one of the leg assemblies 128, when the corresponding leg release button 126 is in the locked state (not depressed), will fail to rotate the leg assembly 128. When depressed, the leg release buttons 126 no longer oppose rotation of the leg assemblies 128, and therefore the leg assemblies 128 can rotate from a deployed position (as seen in FIG. 1) toward a stowed position (rotation toward the stowed position can be seen in FIG. 12). The stowed position can comprise the leg assemblies 128 being substantially 90° rotated from the deployed position, or arranged substantially parallel with a longitudinal axis of the firearm, or arranged substantially parallel with the horizontal axis 162. However, in other embodiments, more or less than 90° can separate the stowed and deployed positions. For instance, the arcuate separation between these two positions can be 45° or at least 45°. As another non-limiting example, the arcuate difference between these two positions can be between 85° and 95° apart. In another embodiment, the arcuate difference between these two positions can be between 80° and 100° apart. In yet another embodiment, the arcuate difference between these two positions can be between 75° and 105° apart.

When the leg assemblies 128 are in the stowed position, the leg release buttons 126 are again biased away from a center of the housing 150 in a locked position. Yet, from the stowed position, the leg assemblies 128 can be rotated toward the deployed position with a threshold amount of force, or depression of the leg release buttons 126. This makes deploying the leg assemblies 128 faster and simpler than stowing thereof. In particular, in the stowed position, a first torque applied to the leg assemblies 128 (e.g., to move them from the stowed to the deployed position) will again not cause rotation of the leg assemblies 128. However, a second torque, greater than the first (e.g., greater than an unlocking threshold), will cause the leg release buttons 126 to backdrive (e.g., move in a direction opposing the bias on the leg release buttons 126) such that the leg assemblies 128 can rotate toward the deployed position. In practice, this means that the leg assemblies 128 cannot be moved from the deployed position unless the leg release buttons 126 are sufficiently depressed, while in the stowed positions, the leg assemblies 128 can be unfolded without directly depressing the leg release buttons 126, as long as sufficient torque to overcome the unlocking threshold is applied. As such, small jostling or accidental torques, such as those seen during user marches or rapid vehicle exits, will not deploy the leg assemblies 128 from the stowed position.

FIG. 17 illustrates an embodiment of a foot 170 that can be removably coupled to a bottom of each leg assembly 128. Fixed, non-removable, feet can also be implemented. Each foot 170 can be round, as shown, can include one or more spikes, texture, and/or other variations suited to different ground conditions. In some embodiments, the feet can be multifunctional, for instance, having a spike that retracts within a ball-shaped foot, and can be extended for use on softer/looser ground.

Leg Deploy/Lock Button

Figure 8:
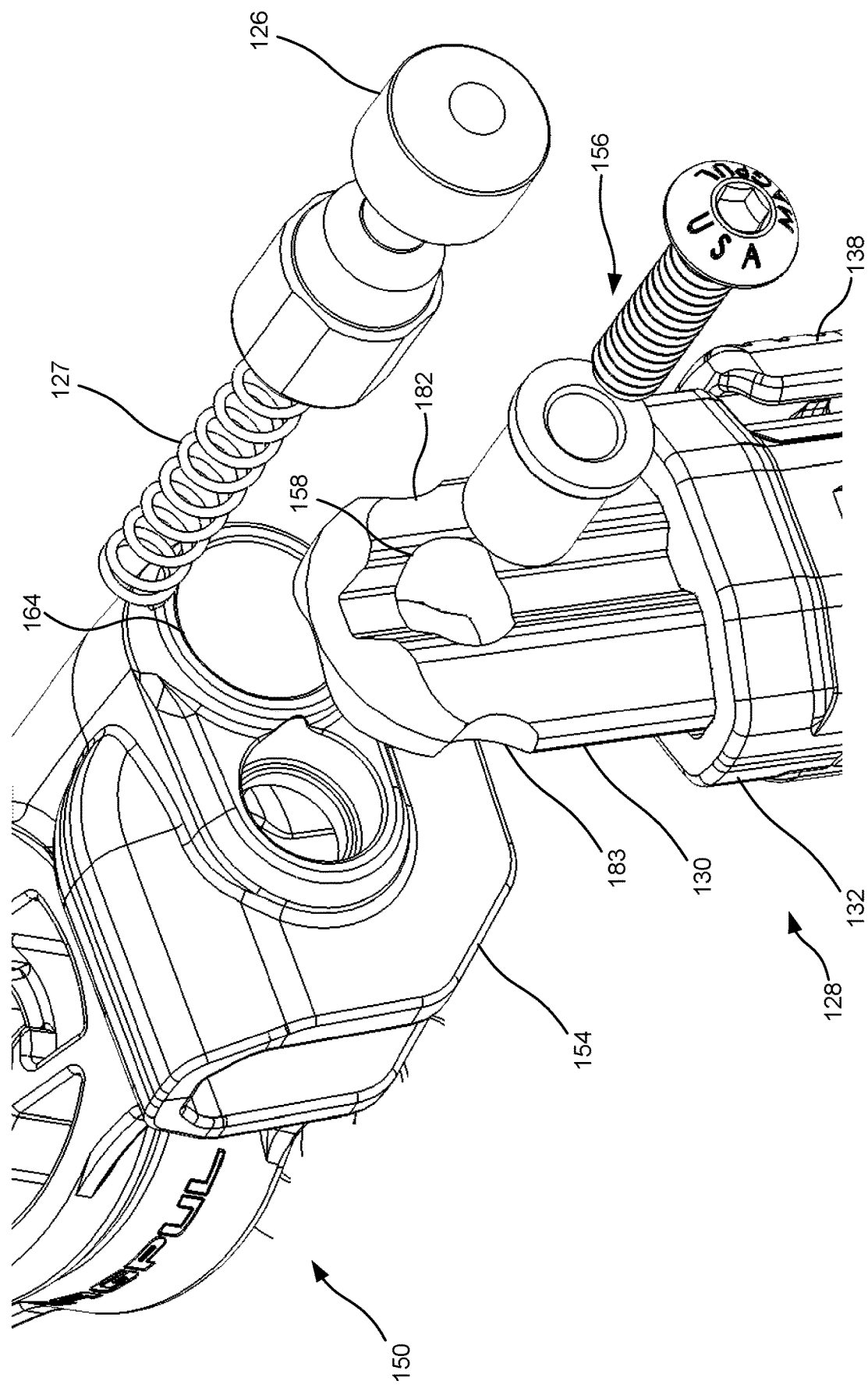
FIG. 8 illustrates a close-up exploded view of the area where one of the leg assemblies, the housing, and a corresponding leg release button interact.

FIG. 8 illustrates a close-up of an exploded view of the leg housing 154, the leg assembly 128, and the leg release button 126. The leg housing 154 is coupled to the housing 150 at an angle and is open on a front and bottom side to accept the leg assembly 128 in either the deployed or stowed positions. The leg assembly 128 can be rotationally coupled to the leg housing 154 via the fastener means 156 (e.g., a screw passing through a bushing and threading into a screw within the housing 150). The fastening means 156 and the leg assembly 128 can rotate around the leg deployment pivot axis 184 of the leg assembly 128 (see FIG. 27). The leg assembly 128 comprises an inner leg portion 130 and an outer leg portion 132, the outer leg portion 132 slides along the inner leg portion 130 to effect telescoping of the leg assembly 128. The leg release button 126 can be arranged within the leg locking aperture 164. The leg release button 126 can have a maximum outer diameter that is smaller than an inner diameter of the leg locking aperture 164. The leg release button 126 and the leg locking aperture 164 can be concentric to and arranged along a common axis (not shown), and the leg release button 126 can be biased along this axis away from the housing 150 and can be depressed toward the housing 150 to reach the unlocked state. The leg release button 126 can be biased away from the housing 150 via the button biasing mechanism 127 (e.g., a spring). The spring or button biasing mechanism 127 can be arranged between the leg release button 126 and an inner end of the leg locking aperture 164.

The leg release button 126 can be split into at least two lengths, a first length 172, and a second length 176, as seen in FIG. 10B. The second length 176 can have a smaller diameter than the first length 172. A third length, 174, may be arranged between the first and second lengths 172, 176, and may have a conical shape such that it creates a smooth transition between the first and second lengths 172, 176. The first length 172 may be tubular or conical, however, if conical, its angle is less than the angle of the third length 174. The inner leg portion 130 can include at least two conical cutouts 182 and 180, and optionally a third conical cutout 183 (see FIGS. 11A, 11C, 11E and 27A). The first conical cutout 182 can be arranged near a top of the inner leg portion 130, and along a narrow side edge of the inner leg portion 130. The first conical cutout 182 can have the shape of a portion of a cone (i.e., a conical frustum), and this shape can mimic or be similar to the conical shape of a first length 172 of the leg release button 126 (e.g., see FIG. 11B). Accordingly, when the leg release button 126 is in the locked state, and the leg assembly 128 is in the deployed position, the first length 172 and the first conical cutout 182 are shaped and positioned to interface and make a flush arcuate connection (e.g., see FIGS. 10A, 10B, and 27A). Given this interface, the leg assembly 128 cannot rotate. However, when the leg release button 126 is depressed to the unlocked state (e.g., see FIGS. 10C, 10D, and 27B), then the leg assembly 128 can rotate since the leg assembly 128 is able to clear the second length 176.

It should be noted that cylindrical cutouts can be used in place of the first and third conical cutouts 182, 183. Additionally, a cylindrical cutout can be substituted for the second conical cutout 180. While the interfacing to the leg release button 126 may not be as beneficial as conical cutouts, the inventors have found that cylindrical shapes will also acceptably interface. Where cylindrical cutouts are used, the cutouts can be angled slightly relative to a longitudinal axis of the leg assembly to better interface with the conical frustum shaped first and third lengths 172, 174 of the leg release button 126.

FIGS. 27A and 27B provide another view of the interfacing of the leg assembly 128 and the leg release button 126 in the locked (FIG. 27A) and unlocked states (FIG. 27B). The top or end of the inner leg portion 130 of the leg assembly 128 can include a curved edge 185, and this curved edge 185 can extend in an arcuate fashion between two of the conical cutouts 182, 180, 183 (e.g., between a first and third conical cutout 182, 183). The curved edge 185 can have a circular profile and thus maintains a constant distance or radius, $R_1$, from the leg deployment pivot axis 184 along its whole curved circumference. An innermost edge of the first conical cutout 182 can be arranged a second distance, $R_2$, from the leg deployment pivot axis 184. When the first length 172 and the first conical cutout 182 interface, in the locked state of the leg deployment button 126, a circumference of the second length 176 is a third distance, $R_3$, from the leg deployment pivot axis 184. The first distance, $R_1$, is less than the third distance, $R_3$, while the second distance, $R_2$, is less than both $R_1$ and $R_3$. Because the radius, $R_1$, of the curved edge 185 intersects with the first length 172 in the locked state (i.e., the first distance, $R_1$, is greater than the second distance, $R_2$), the leg assembly 128 cannot rotate. However, when the leg release button 126 is depressed into the unlocked state (FIG. 27B), the leg assembly 128 (or the curved edge 185) lines up with the second length 176 rather than the first length 172, and since the first distance, $R_1$, is less than the third distance, $R_3$, the leg assembly 128 can rotate and the curved edge 185 is able to clear the second length 176.

The second conical cutout 180 can be arranged at a top end of the inner leg portion 130, and be scalloped out of one side of that top end as seen in FIG. 11A. The second conical cutout 180 can have the shape of a portion of a cone, and this shape can mimic or be similar to the conical shape of the third length 174 of the leg release button 126. In other words, the angle of the second conical cutout 180 can be greater than an angle of the first and third conical cutouts 182, 183. Accordingly, when the leg release button 126 is in the locked state, and the leg assembly 128 is in the stowed position, the third length 174 and the second conical cutout 180 are shaped and positioned to interface and make a flush arcuate connection. Given this interface, the leg assembly 128 can rotate when sufficient torque is applied to backdrive the leg release button 126. The greater angle of the third length 174 makes it possible for backdriving, whereas the shallow angle of the first length 172 prevents backdriving. In other words, an angle or shape of the third length 174 can be selected to select the unlocking threshold and the angle or shape of the first length 172 can be selected to prevent backdriving under most torque conditions. A steeper angle of the third length 174 leads to a lower unlocking threshold, and a shallower angle leads to a higher unlocking threshold (i.e., an inverse relationship between the two). While the leg assembly 128 is in the stowed position, the leg release button 126 can also be depressed into an unlocked state, thereby providing an alternative way to deploy the leg assembly 128.

The leg release button 126 is arranged near, but not coincident with the leg deployment pivot axis 184 (see FIGS. 27A and 27B). The leg release button 126 can have a locked state (see FIGS. 10A, 10B, and 27A) and an unlocked state (see FIGS. 10C, 10D, and 27B) when the leg assembly 128 is in the deployed position. When the leg release button 126 is depressed, it can move from the locked state to the unlocked state—moving toward the housing 150. In FIGS. 10A-10D, the housing 150 is arranged to the left of the figures. Thus, in the unlocked state, FIGS. 10C and 10D, the leg release button 126 has been moved closer to the housing 150.

FIG. 10A shows a side view of the interaction between the leg release button 126 (dashed lines) and an end of the inner leg portion 130 of the leg assembly 128. FIG. 10B shows an overhead view of the interaction between the leg release button 126 and the end of the inner leg portion 130 of the leg assembly 128. FIG. 10C shows a side view of the interaction between the leg release button 126 (dashed lines) and the end of the inner leg portion 130 of the leg assembly 128. FIG. 10D shows an overhead view of the interaction between the leg release button 126 and the end of the inner leg portion 130 of the leg assembly 128.

The first length 172 can have a tubular or conical shape. If tubular, then the first length 172 has a diameter, $D_1$, and if conical, then the first length has two diameters, $D_2$ and $D_3$, where $D_2 > D_3$. The second length 176 has a diameter, $D_4 < D_3 < D_2$, and if applicable, $D_4 < D_1$. If the third length 174 is implemented, then it has a conical shape and thus two diameters, $D_3$ and $D_4$. Where the first and third lengths 172, 174 meet, they have the same diameter, $D_3$, and where the second and third lengths, 176, 174 meet, they have the same diameter, $D_4$.

While both the first and second lengths 172, 176 can be conical, an angle of the third length 174 relative to the common axis between the leg release button 126 and the leg locking aperture 164, can be greater than an angle of the first length 172 relative to this axis. This is easily seen in the greater conical nature of the third length 174 seen in FIGS. 10A-10D. In an embodiment, the angle of the first length 172 can be less than or equal to 20°. In another embodiment, the angle of the first length 172 can be less than or equal to 15°. In another embodiment, the angle of the first length 172 can be less than or equal to 10°. In another embodiment, the angle of the first length 172 can be less than or equal to 5°. In an embodiment, the angle of the third length 174 can be 45°. In an embodiment, the angle of the third length 174 can be between 40° and 50°. In an embodiment, the angle of the third length 174 can be between 30° and 60°.

To enter the unlocked state, the inner leg portion 130 clears the first length 172 as seen in FIGS. 10C and 10D. If part of the inner leg portion 130 is still overlapping the first length 172, then the leg release button 126 is still considered in a locked state. Where the third length 174 is implemented, the unlocked state may be defined as a position where the inner leg portion 130 clears both the first and second lengths 172, 176 (also see in FIGS. 10C and 10D). Said another way, in the locked state the first conical cutout 182 interfaces with (and is optionally flush with) the first length 172. In the unlocked state, the first conical cutout 182 does not interface with the first length 172. The first conical cutout 182 may be aligned with the third length 174 as shown in FIG. 10C, but due to the difference in diameter between the first conical cutout 182 and the second length 176, no interfacing between these two is possible, and thus the leg assembly 128 is able to freely rotate from the deployed toward the stowed position.

FIGS. 11A-11C show the leg release button 126 in a locked state. Here, the second conical cutout 180 interfaces with, and is optionally flush with, the third length 174. When a torque is applied to the leg assembly 128, a force into or out of the page in FIG. 11B is applied from the leg assembly 128 to the third length 174. Since the third length 174 is conical, a force into or out of the page has a component of lateral force as well. If the torque is equal to or exceeds the unlocking threshold, then the leg release button 126 is backdriven, or forced to move against the bias of the button biasing mechanism 127 (recall FIG. 8). As the leg release button 126 is backdriven, moved to the left in FIG. 11E, the leg assembly 128 can clear the second length 176 and is thus able to rotate back toward the deployed position.

While only first and second conical cutouts 182, 180 have been described, in some embodiments, the third conical cutout 183 can be implemented (and as shown in the figures). The third conical cutout 183 can be shaped like the first conical cutout 182, but can be arranged on an opposing narrow edge of the inner leg portion 130, and can have the same functionality as the first conical cutout 182 when the leg assemblies 128 are reversed.

While the conical cutouts 180, 182, 183 have been described as having conical shapes, in other embodiments these cutouts can be scalloped or curved.

Leg Extension

The leg assemblies 128 can each include the inner leg portion 130 and the outer leg portion 132 having a sliding relation to each other—the inner leg portion 130 sliding within the outer leg portion 132. This sliding relation allows the leg assemblies 128 to extend and shorten in length (i.e., telescope). To control extension of the leg assemblies 128, a leg extension locking component 138 can have a sliding coupling to each leg assembly 128. The leg extension button can be arranged on an inside or outside of the leg assemblies 128 (an inside arrangement is shown in the figures). The leg assemblies 128 are reversible, such that the leg extension locking components 138 can be arranged on an outside of the leg assemblies 128.

The leg extension locking component 138 can be biased into position via springs or another biasing apparatus (e.g., see FIG. 15). The biasing force can be arranged parallel to the horizontal axis 162 when the leg assemblies 128 are in the deployed position. Thus, the leg extension locking components 138 are biased in parallel to the horizontal axis 162, and a user can depress the leg extension locking components 138 parallel to the horizontal axis 162 to oppose the biases, and release the leg assemblies 128 for telescoping. FIG. 13 shows how depressing a leg extension button allows a leg to be extended (or shortened).

Figure 14A:
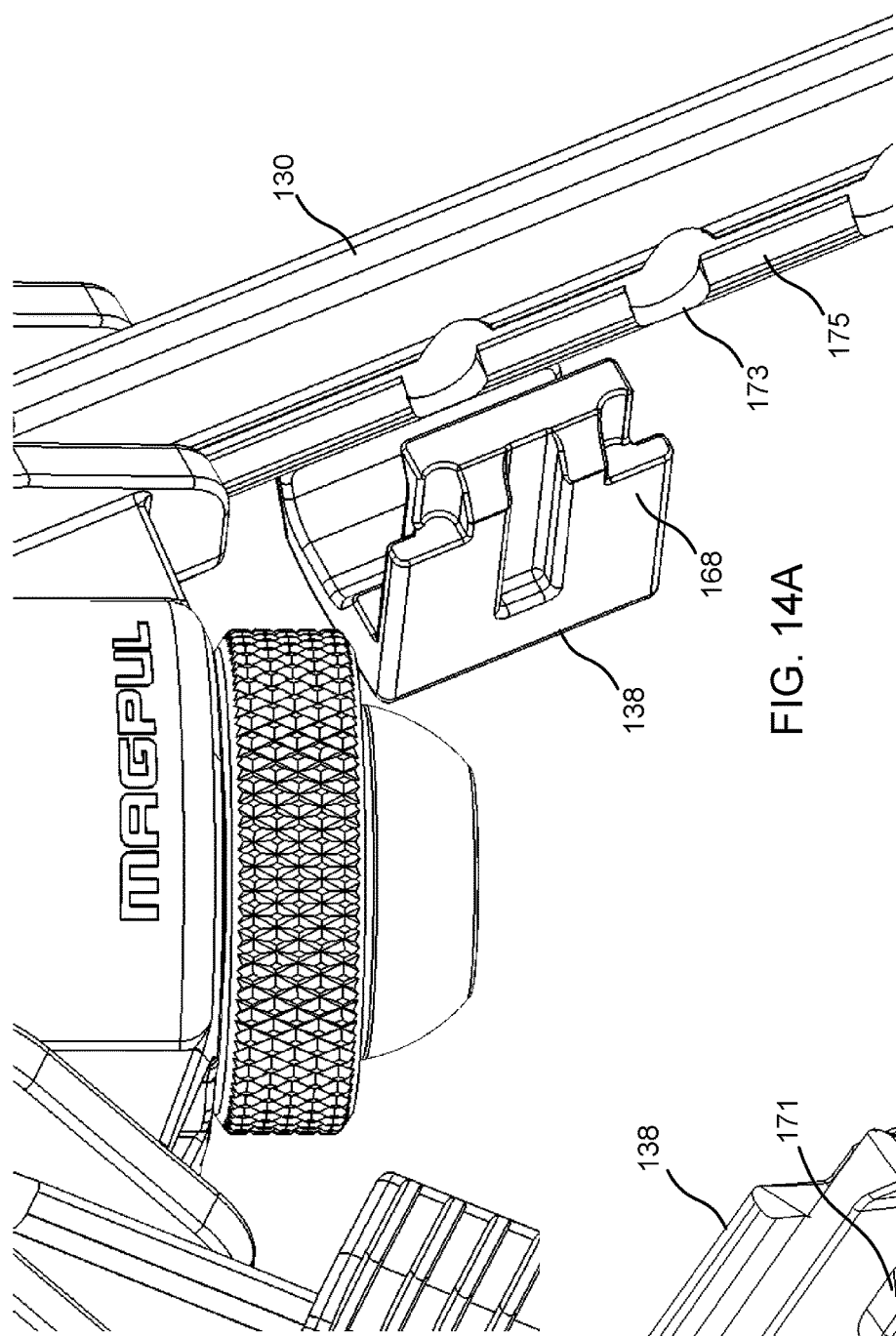
FIG. 14A illustrates a close-up view of the leg extension locking component in relation to an inner leg portion of a leg assembly (with the outer leg portion hidden to reveal the horizontal and vertical tracks of the inner leg portion)
Figure 14B:
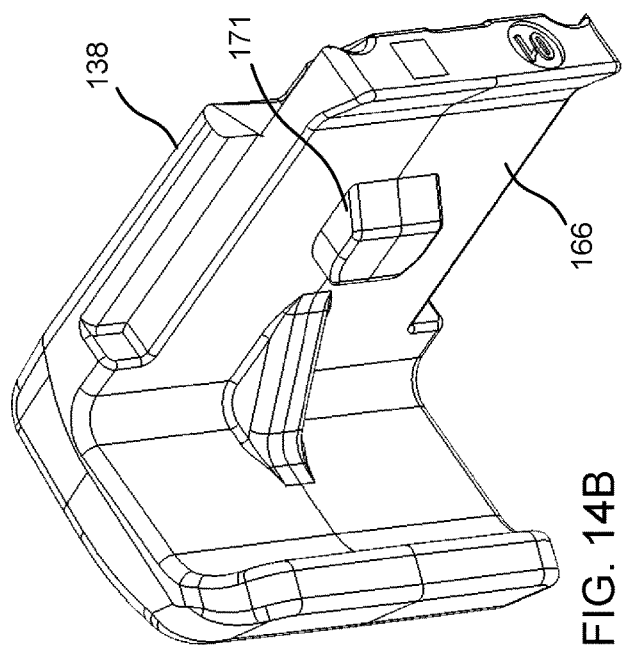

FIGS. 14A and 14B show close-up views of an embodiment of the leg extension locking component 138. The leg extension locking component 138 can include an inner side 166 and an outer side 168. The inner side 166 can include a detent 171 shaped to fit within any of the horizontal tracks 173 in inner leg portion 130. When the leg extension locking component 138 is depressed, the detent 171 is moved sideways into a vertical track 175 in the inner leg portion 130 where vertical movement of the detent along the vertical track 175 is possible. Since the leg extension locking component 138 is coupled to the outer leg portion 132, the outer leg portion 132 can slide along the inner leg portion 130 until a desired extension point. When the leg extension locking component 138 is released, the bias pushes the leg extension locking component 138 along one of the horizontal tracks 173 and out of the vertical track 175 and prevents further telescoping.

The illustrated embodiments show seven horizontal tracks 173, though this number can be larger or smaller depending on the size of the bipod and the level of desired telescoping granularity. The vertical track 175 can be included on both sides of the inner leg portion 130 as can the horizontal tracks 173, to enable reversibility of the leg assemblies 128.

Although this description has used the term horizontal track 173, in other embodiments, notches or other shapes and volumes could be used to accept the detent 171 out of the vertical track 175 when the leg extension locking component 138 is released.

Leg Assembly Cross Section

FIG. 16 illustrates a view of the hollow interior 131 of the outer leg portion 132 of the leg assembly 128, where the hollow interior 131 is configured to accept the inner leg portion 130. The inner leg portion 130 can have narrower dimensions than the outer leg portion 132, such that the inner leg portion 130 can telescopically slide within the hollow interior 131 of the outer leg portion 132. The inner leg portion 130 can have one of various shapes designed to enhance strength, while minimizing weight and size (e.g., an elongated, diamond-shaped, or ovular cross section as shown), though an elongated or diamond-shape is used for illustration.

FIGS. 8, 9, and 16 illustrate various views of the elongated cross section of the leg assemblies 128. The general characteristic of the elongated cross section is a width W that is less than a length L of the cross sections as seen in FIG. 16. The result is strength in a more compact package (i.e., a narrower bipod when viewed head on). Exemplary dimensions are shown in FIG. 16. The inner leg portion 130 has a width, $W_1$, and a length, $L_1$, while the hollow interior of the outer leg portion 132 has a width, $W_2$, and a length, $L_2$. The widths are both smaller than the lengths (i.e., $W_1 < L_1$ and $W_2 < L_2$) and the width and length of the inner leg portion 130 are smaller than the width and length of the hollow interior 131 of the outer leg portion 132, respectively (i.e., $W_1 < W_2$ and $L_1 < L_2$).

Each inner leg portion 130 may also include a plurality of horizontal tracks 173 or notches, these depressions occurring on either side of a given vertical track 175. Both the vertical tracks 175, 177 and the horizontal tracks 173 can be shaped and sized to accept the detent 171 of the leg extension locking component 138.

Each outer leg portion 132 can include an alignment detent 186 extending inward from an inner long side of each outer leg portion 132, each alignment detent 186 corresponding to and shaped to fit within and interface with the vertical tracks 175, 177 of a corresponding inner leg portion 130. For instance, where a single vertical track 175 is implemented on an inner leg portion 130, a single alignment detent 186 on the outer leg portion 132 can be used (not shown). Where two vertical tracks 175, 177 are implemented, two alignment detents 186 can be used (as shown).

Pivot/Cant Assembly

FIG. 19 illustrates an exploded view of the components associated with pivot and canting of the bipod. As seen, the pivot/cant assembly 124 can be pivotally coupled to the housing 150. The housing 150 can include a vertical housing aperture 153 having a first diameter. The pivot/cant assembly 124 can include the pivot block 112, the firearm interface 102, the cant nut 108, and optionally the locking pin 121. The pivot block 112 can include the tubular detent 151 extending down from a bottom of the pivot block 112 and having a second outer diameter smaller than the first diameter. As such, the tubular detent 151 can fit into and rotate within the vertical housing aperture 153 in the housing 150. The pivot block 112 may further include a concave hollow 114 FIG. 19 on a top of the pivot block 112 opposite to the tubular detent 151. The pivot/cant assembly 124 may include the firearm interface 102 including the curved bottom surface 104, the curved bottom surface 104 having the same or a similar diameter as the concave hollow 114 of the pivot block 112. The pivot/cant assembly 124 may further include the pivot rod 110 having a smaller outer diameter than the first diameter of the vertical housing aperture 153 such that the pivot rod 110 can pass through the vertical housing aperture 153 and pivot relative to the housing 150. Coupled to a top of the pivot rod 110 can be the cant nut 108 having a tubular shape and a diameter smaller than an inner diameter of the tubular aperture 106 in the firearm interface 102, such that the firearm interface 102 can rotate or cant around the cant nut 108.

A locking knob 120 can be pivotally coupled to a bottom of the pivot rod 110 (e.g., via a threaded connection to the pivot rod 110). When the locking knob 120 is rotated, the pivot rod 110 moves up or down along the vertical axis 160. As the cant nut 108 is coupled to a top of the pivot rod 110, when the locking knob 120 is rotated, both the pivot rod 110 and the cant nut 108 move up and down in unison. As a result, the cant nut 108 moves up to release the pivot block 112 as well as the firearm interface 102. When the cant nut 108 is pulled down, it presses the bottom of the firearm interface 102 against the concave hollow 114 of the pivot block 112, and the cant/pivot assembly 124 is locked (or at least tightened) in a given cant position (e.g., via friction fit). However, the pivot block 112 is still free to pivot atop the housing 150. In this way, a cant of the firearm relative to the bipod can be selected and locked, while still allowing pivoting of the firearm. If an optional pivot lock detent 190 is not implemented, then the pivot block 112 and firearm interface 102 can pivot 360° even when the locking knob 120 has been turned to lock the firearm interface 102 into a given cant position. However, and as discussed in detail later, if the pivot lock detent 190 is implemented along with detent receiving hollows in the housing 150, then pivoting may be limited once the firearm interface 102 has been locked down or at least tightened down.

The locking knob 120 and the pivot rod 110 can be in threaded relation such that turning of either causes a relative vertical movement between these two components (i.e., when the locking knob 120 is fixed in a vertical position against the underside of the housing 150, then the pivot rod 110 will move up and down relative to the locking knob 120 when the locking knob 120 is rotated). The firearm interface 102 can include an ovular aperture 140 that intersects the tubular aperture 106, the ovular aperture 140 passing through a bottom of the firearm interface 102, but not through a top or an entirety thereof. Thus, the ovular aperture 140 and the tubular aperture 106 form a t-shaped hollow within the firearm interface 102 that accept the t-shaped assembly of the pivot rod 110 and the cant nut 108. The ovular aperture 140 of the firearm interface 102 is shaped to accept an upper portion of the pivot rod 110. The ovular aperture 140 in the firearm interface 102 can have an ovular cross section (e.g., see FIG. 22), such that the firearm interface 102 can cant upon the cant nut 108 without the pivot rod 110 running into sides of the ovular aperture 140.

A biasing means 122 (e.g., spring, stacked springs, coaxial springs, washers, one or more split-lock washers, stacked split-lock washers, wave washers) can be arranged between the locking knob 120 and a bottom of the housing 150. Alternatively, the bottom of the housing 150 can include an indentation shaped to accept some or all the biasing means 122 such that the locking knob 120 can rest virtually flush against a bottom of the housing 150. The biasing means 122, can create a bias tending to push the locking knob 120 and the housing 150 apart.

FIG. 22 illustrates another view of the pivot and cant assembly of FIGS. 19-21, showing the ovular aperture 140 in a bottom of the firearm interface 102. This allows the pivot rod 110 to pass through the ovular aperture 140 while also allowing various cant angles of the firearm interface 102.

FIG. 21 shows an embodiment of a cant and pivot assembly 124 in three different positions showing rotation of the locking knob 120 to loosen the cant nut 108 and hence the firearm interface 102 from the pivot block 112. Specifically, rotating the locking knob 120 in a first direction (left image) allows the pivot rod 110, the cant nut 108, and the firearm interface 102 to move upwards (middle image) thereby enabling the firearm interface 102 to cant (right image). When a desired cant is achieved, the locking knob 120 can be tightened and the firearm interface 102 is once again pulled down into the concave hollow 114 thereby locking the degree of cant. In practice, a weight of the firearm on the firearm interface 102 will keep the firearm interface 102 and pivot block 112 in contact even when the locking knob 120 is loosened. However, for illustrative purposes, a gap has been shown between the firearm interface 102 and the pivot block 112.

In some embodiments, the entire cant/pivot assembly 124 can pivot relative to the housing 150. Rotation of the locking knob 120 can adjust resistance to pivoting of the cant/pivot assembly 124 by adjusting friction between the pivot block 112 and the housing 150. In this way, the degree of cant can be locked in, yet allow pivoting of the firearm, and where a looseness of pivoting is selectable via the locking knob 120.

In other embodiments, the pivot rod 110 may be fixed relative to the housing 150 (an embodiment where the pivot rod 110 is fixed to the housing 150 is not illustrated). In other words, canting but not pivoting is possible. However, in another embodiment, the firearm interface 102 and the cant nut 108 can pivot around the pivot rod 110 instead of the pivot rod rotating relative to the housing 150.

Reversible Pan/Lock Pivot Block

In an embodiment, the pivot block 112 may have the optional pivot lock detent 190 (e.g., see FIG. 19) enabling a given pivot position to be locked. The pivot lock detent 190 can extend from a bottom side of the pivot block 112 and be arranged at a distance from the vertical axis 160. The pivot lock detent 190 can be coupled to a bottom of the pivot block 112 and a side of the tubular detent 151. The arcuate location of the pivot lock detent 190 around the vertical axis 160 is not paramount. A top of the housing 150 may include a first and second detent receiving hollows 192, 194 (see FIG. 28) being shaped to allow entry of the pivot lock detent 190. A first of these detent receiving hollows 192 can have a greater arcuate length than a second detent receiving hollow 194, and as a result, when the pivot lock detent 190 is arranged within this larger of the two detent receiving hollows 192, the pivot lock detent 190 and hence the pivot block 112 and firearm interface 102, are able to pivot or rotate around the vertical axis 160 to a greater extent than when the pivot lock detent 190 is arranged in the smaller detent receiving hollow 194. In an embodiment, the smaller detent receiving hollow 194 has a sufficient arcuate length to allow the pivot lock detent 190 to enter the second detent receiving hollow 194, but not to allow any rotation of the pivot block 112. In other words, when the pivot lock detent 190 is arranged in this smaller detent receiving hollow 194, the pivot block 112 is rotationally locked in place. Thus, this embodiment allows a user to lock or unlock the pivoting movement of the firearm interface 102.

In an embodiment, these two detent receiving hollows 192, 194 can be roughly 180° apart from each other as measured in a circle around the vertical axis 160. Since the larger of the detent receiving hollows 192 spans an arcuate region of the housing 150, when measuring the above-noted 180° separation between the two hollows 192, 194, one can measure from an arcuate center of both hollows 192, 194.

The purpose of the two detent receiving hollows 192, 194 having a roughly 180° separation, is to allow a user to pivot the firearm while the pivot lock detent 190 is arranged in the larger of the two detent receiving hollows 192, 194, and once a desired pivot position is found, the locking knob 120 can be rotated to loosen the firearm interface 102 from the pivot block 112, a user can lift the pivot block 112 sufficiently so that the pivot lock detent 190 clears the housing 150, and the use can rotate the pivot block 112 (without rotating the firearm interface 102) (see FIG. 20) 180° until the pivot lock detent 190 can be lowered into the smaller of the two detent receiving hollows 194. In other words, rotating the pivot block 112 180° without rotating the firearm interface 102 allows one to lock in a given pivot position.

The arcuate length of the larger detent receiving hollow 192 can be such that the pivot block 112 is able to pivot through at least 45°, or at least 90°, or at least 180°, or at least 270° when the pivot lock detent 190 is in the larger of the two detent receiving hollows 192, 194. It should be noted that FIG. 28 illustrates just one of many configurations and orientations of the two detent receiving hollows 192, 194.

Firearm Interface

FIG. 23 illustrates an embodiment of a firearm interface configured for M-LOK interfacing with a firearm.

FIGS. 24-25 illustrate an embodiment of a firearm interface configured for rail interfacing (e.g., Picatinny or NATO rail, to name two non-limiting examples). The illustrated firearm interface 102b can be made from a polymer or other flexible material, such that rotation of the fasteners 142 (only one of which is shown) can clamp the rail interface 144 to a rail or release the rail interface 144 from a rail. While the illustrated firearm interface 102b is a unitary design, in other embodiments, the rail interface 144 may be a two-part design, where tightening of the fasteners 142 causes the two parts of the rail interface 144 to move together and thereby lock onto a rail.

FIG. 26 illustrates another embodiment of a firearm interface 102c configured for sling stud interfacing. In some embodiments, this firearm interface 102c can couple to an M-LOK interface, such as the M-LOK interface shown in FIGS. 1-8.

FIG. 29 illustrates a method of stowing deployed legs of a bipod according to an embodiment of this disclosure. The method 100 can include depressing a leg release button (Block 2902) and applying a stowing torque to a leg assembly (Block 2904). The method 100 can then include aligning a circular edge at a top of a leg assembly with a narrower length of the leg release button (Block 2906), rotating the leg assembly from a deployed position toward a stowed position (Block 2908), and clearing a wider length of the leg release button with the circular edge of the leg assembly during the rotating (Block 2910).

FIG. 30 illustrates a method of deploying stowed legs of a bipod according to an embodiment of this disclosure. The method 3000 can include applying a torque to a leg assembly (Block 3002) to attempt to rotate the leg assembly from a stowed position toward a deployed position. If the torque does not exceed an unlocking threshold (Decision 3004), then the leg release button does not move and the leg assembly remains locked in place by the leg release button (Block 3006). However, if the torque is great enough, then the leg release button is backdriven (Block 3008) (i.e., driven against its bias and toward the housing) allowing the circular edge of the leg assembly to align with a narrower length of the leg release button such that the leg assembly can clear the leg release button (Block 3010) while rotating from the stowed position toward the deployed position (Block 3012).

FIG. 31 illustrates a method of extending or collapsing legs of a bipod according to an embodiment of this disclosure. The method 3100 includes depressing a leg extension locking component (Block 3102), which in turn causes a detent of the leg extension locking component to move into a vertical track of an inner leg portion of a leg assembly (Block 3104). A user can then extend the leg (Block 3106) with the leg extension locking component depressed. When a desired length is achieved, the user can release the leg extension locking component (Block 3108). If the detent of the leg extension locking component is aligned with a horizontal track or one of a plurality of notches (Decision 3110), then the detent traverses into the horizontal track or notch (Block 3112) and can lock the leg assembly in the current position (Block 3116). If not, then the user may need to move an outer leg portion of the leg assembly up or down (Block 3114) until the detent of the leg extension locking component aligns with one of the horizontal tracks (Decision 3110). The detent can then traverse horizontally (Block 3112) and lock the leg assembly in the current position (Block 3116).

FIG. 32 illustrates a method of pivoting and canting a firearm interface assembly according to an embodiment of this disclosure. The method 3200 can include rotating a locking knob of a bipod (Block 3202) to release tension on a cant/pivot assembly. Once tension is relieved, a firearm interface can be canted relative to a housing of the bipod (Block 3204). Once a desired cant has been achieved, the locking knob can be rotated in the opposing direction (Block 3206) to tighten the assembly and lock the cant angle. Despite the cant being locked in, a user can still pivot or rotate the firearm interface relative to the bipod housing (Block 3208). In an optional embodiment, the bipod may include structure for locking in a current pivot position. Thus, the method 3200 may further include the optional step of rotating the locking knob in the first direction (optional Block 3210) to allowing a pivot block between the firearm interface and the bipod housing to be raised sufficiently to allow clearance of a pivot lock detent relative to the housing (optional Block 3212). The pivot block in unison with the firearm interface can then be rotated 180° (or roughly 180°) (Block 3214) and the locking knob can again be tightened (Block 3216) via rotation in the second direction. This turning then locks the pivot block into a current pivot angle (Block 3218).

In an embodiment, the optional Block 3212 can include rotating the pivot block and firearm interface in unison until the pivot lock detent is aligned with a second detent receiving hollow (shorter in arcuate length than a first detent receiving hollow, these hollows typically opposing each other across the housing).

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A firearm bipod assembly, the bipod assembly comprising:
    two legs having a stowed and a deployed position, and each of the two legs having a first portion and a second portion;
    a bipod housing having a first leg interface rotatably coupled to a first of the two legs and a second leg interface rotatably coupled to a second of the two legs; and
    a first and second bipod leg deployment lock each coupled to the bipod housing,
    the first bipod leg deployment lock configured to contact the first bipod leg at the first portion on the first bipod leg in the stowed position, but not at the second portion, and at the second portion on the first bipod leg in the deployed position, but not at the first portion,
    the second bipod leg deployment lock configured to contact the first portion on the second bipod leg in the stowed position, but not at the second portion, and at the second portion on the second bipod leg in the deployed position, but not at the first portion;
    wherein, when the two legs are in the deployed position, each of the bipod leg deployment locks is shaped to prevent rotation of the two legs toward the stowed position via leg-lock contact at the second portion;
    wherein, when the two legs are in the stowed position, each of the bipod leg deployment locks is shaped to prevent rotation of a corresponding one of the two legs toward the deployed position when less than an unlocking threshold torque is applied to that leg via leg-lock contact at the first portion, and to allow rotation of the two legs toward the deployed position when the unlocking threshold torque is met or surpassed via leg-lock contact at the first portion.

2. The firearm bipod assembly of claim 1, wherein the leg deployment lock moves roughly perpendicular to a plane of movement of a corresponding one of the two legs.

3. The firearm bipod assembly of claim 2, wherein the leg deployment lock moves in a channel of the bipod housing.

4. The firearm bipod assembly of claim 2, wherein the leg deployment lock comprises a button that is backdriven when the unlocking threshold torque is applied to a corresponding of the two legs and the corresponding of the two legs is in the stowed position.

5. The firearm bipod assembly of claim 4, wherein the button cannot be backdriven when the corresponding of the two legs is in the deployed position.

6. The firearm bipod assembly of claim 1, wherein each of the bipod legs includes a first cutout on a side of each leg shaped to interface with a tubular and an angular portion of a corresponding one of the first and second bipod leg deployment locks in the deployed position.

7. The firearm bipod assembly of claim 6, wherein each of the bipod legs includes a second cutout on an opposing side of each leg.

8. The firearm bipod assembly of claim 6, wherein each of the bipod legs includes a second cutout shaped to interface with an angular portion of a corresponding one of the first and second bipod leg deployment locks.

9. The firearm bipod assembly of claim 6, wherein the first cutout has a crescent shape.

10. The firearm bipod assembly of claim 6, wherein the first cutout has a conical shape.

11. The firearm bipod assembly of claim 1, wherein each of the two legs includes a curved top end having a constant radius, and wherein the radius interferes with a corresponding one of the first and second bipod leg deployment locks when the lock is extended away from the bipod housing, and wherein the radius clears the corresponding one of the first and second bipod leg deployment locks when the lock is depressed toward the bipod housing.

12. The firearm bipod assembly of claim 1, wherein the bipod leg deployment locks each comprise:
    an elongated and cylindrical cross section split into at least two lengths, the lengths extending along a longitudinal axis of the bipod leg deployment lock;
    a first of the lengths being a conical frustum with sides angled from the longitudinal axis, and at least a first diameter at a narrowest end of the conical frustum; and
    a second of the lengths having a second diameter, smaller than the first diameter.

13. The firearm bipod assembly of claim 12, wherein the sides of the conical frustum are angled from the longitudinal axis at an angle selected from the range including and extending between 0° and 30°.

14. A method of deploying a bipod leg, the method comprising:
    providing a bipod having two legs, the two legs having a stowed and a deployed position, and each of the two legs having a first portion and a second portion;
    providing a housing rotatably and independently coupled to each of the legs; and
    providing a movable bipod deployment mechanism for each of the two legs, the bipod deployment mechanism for each of the two legs being movably coupled to the housing and each being selectively in contact with a corresponding one of the two legs;
    applying a first torque to one of the two legs while the one of the two legs is in the stowed position, the first torque being less than an unlocking threshold such that the movable bipod deployment mechanism corresponding to the one of the two legs prevents the one of the two legs from rotating toward the deployed position; and
    applying a second torque to the one of the two legs while the one of the two legs is in the stowed position, the second torque being greater than or equal to the unlocking threshold, wherein the corresponding moveable bipod deployment mechanism is pressed out of a locked position by the one of the two legs thereby allowing the one of the two legs to rotate toward the deployed position.

15. The method of claim 14, wherein the corresponding movable bipod deployment mechanisms directly contacts the one of the two legs when extended away from the housing and does not contact the one of the two legs when depressed toward the housing.

16. The method of claim 15, wherein a first portion of each leg directly contacts a corresponding one of the two movable bipod deployment mechanisms when the corresponding leg is in the deployed position, and wherein a second portion of each leg directly contacts the corresponding one of the two movable bipod deployment mechanisms when the corresponding leg is in the stowed position.

17. The method of claim 14, further comprising:
wherein each of the movable bipod deployment mechanisms has a first and a second length, the first length having a first diameter, and the second length having a second diameter smaller than the first diameter, and the second length being further from a pivot axis of a corresponding one of the two legs than the first length,
wherein each of the two legs includes a curved top edge,
such that when either of the movable bipod deployment mechanisms is depressed and a corresponding one of the two legs rotates, the curved top edge clears the second length.

18. The method of claim 14, further comprising:
wherein each of the movable bipod deployment mechanisms has a third length being a conical frustum and being arranged between and forming an angled connection between the first and second lengths;
applying a torque to either of the two legs in a direction from the stowed position toward the deployed position;
backdriving a corresponding one of the two movable bipod deployment mechanisms via the third length interacting with a conical or crescent cutout on a side of a corresponding one of the two legs; and
rotating the corresponding one of the two legs from the stowed position toward the deployed position.

19. A firearm bipod assembly comprising:
two legs having a stowed and a deployed position, and a first portion and a second portion;
a bipod housing having a first leg interface rotatably coupled to a first of the two legs and a second leg interface rotatably coupled to a second of the two legs;
a firearms interface coupled atop the housing; and
a first and second bipod leg deployment lock each coupled to the bipod housing and in operational contact with a respective one of the first and second bipod legs, each of the first and second bipod leg deployment locks slidable in a direction roughly perpendicular to a plane formed by swinging of a corresponding one of the first or second legs;
wherein, when the two legs are in the deployed position, each of the bipod leg deployment locks is shaped to prevent rotation of the two legs toward the stowed position when the two legs are in the deployed position;
wherein, when the two legs are in the stowed position, each of the bipod leg deployment locks is shaped to prevent rotation of the two legs toward the deployed position when less than an unlocking threshold torque is applied to the two legs, and to allow rotation of the two legs toward the deployed position when the unlocking threshold torque is met or surpassed legs and the torque does not deform the first portion and the second portion.

20. The firearm bipod assembly of claim 19, wherein the bipod leg deployment lock is backdriven when the unlocking threshold torque is applied to a corresponding of the two legs in a direction parallel to a plane formed by rotation of the one of the two legs, and the corresponding of the two legs is in the stowed position, but where the bipod leg deployment lock cannot be backdriven, without deformation of the first or second portion, when the corresponding one of the two legs is in the deployed position.

* * * * *